(12) United States Patent
Wang et al.

(10) Patent No.: US 10,405,346 B2
(45) Date of Patent: Sep. 3, 2019

(54) DATA TRANSMISSION METHOD AND APPARATUS

(71) Applicant: Huawei Technologies Co., Ltd., Shenzhen (CN)

(72) Inventors: Da Wang, Beijing (CN); Jian Wang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/544,218

(22) PCT Filed: Jan. 15, 2015

(86) PCT No.: PCT/CN2015/070732
§ 371 (c)(1),
(2) Date: Jul. 17, 2017

(87) PCT Pub. No.: WO2016/112508
PCT Pub. Date: Jul. 21, 2016

(65) Prior Publication Data
US 2018/0014326 A1   Jan. 11, 2018

(51) Int. Cl.
*H04W 4/00*      (2018.01)
*H04W 74/08*   (2009.01)
(Continued)

(52) U.S. Cl.
CPC ....... *H04W 74/0808* (2013.01); *H04L 1/1812* (2013.01); *H04W 16/14* (2013.01); *H04W 74/0825* (2013.01); *H04W 74/0816* (2013.01)

(58) Field of Classification Search
None
See application file for complete search history.

(56) References Cited

U.S. PATENT DOCUMENTS

2002/0037014 A1   3/2002   Myojo et al.
2006/0114928 A1   6/2006   Utsunomiya et al.
(Continued)

FOREIGN PATENT DOCUMENTS

CN   102821399 A   12/2012
CN   103188711 A   7/2013
(Continued)

OTHER PUBLICATIONS

Foreign Communication From A Counterpart Application, European Application No. 15877427.3, Partial Supplementary European Search Report dated Dec. 22, 2017, 16 pages.
(Continued)

*Primary Examiner* — Phirin Sam
(74) *Attorney, Agent, or Firm* — Conley Rose, P.C.

(57) ABSTRACT

A data transmission method and an apparatus relate to the communications field and are applied to data transmission to effectively reduce a collision reoccurrence probability after a device in a licensed-assisted access using Long Term Evolution (LAA-LTE) system preempts an unlicensed spectrum and collides with another device. A first device adjusts a detection moment or a quantity of detection times of clear channel assessment (CCA) of a channel in an unlicensed spectrum after the first device determines that the first device collides with another device when occupying the channel in the unlicensed spectrum to transmit data, and the first device occupies, according to an adjusted detection moment or an adjusted quantity of detection times of CCA of the channel in the unlicensed spectrum, the channel in the unlicensed spectrum to transmit data.

17 Claims, 17 Drawing Sheets

(51) Int. Cl.
*H04L 1/18* (2006.01)
*H04W 16/14* (2009.01)

(56) References Cited

U.S. PATENT DOCUMENTS

| | | | |
|---|---|---|---|
| 2011/0134818 A1 | 6/2011 | Bae et al. | |
| 2012/0315857 A1 | 12/2012 | Ichikawa | |
| 2014/0355534 A1 | 12/2014 | Vermani et al. | |
| 2015/0312793 A1* | 10/2015 | Jeon | H04W 28/0205 370/329 |
| 2016/0073344 A1* | 3/2016 | Vutukuri | H04W 52/0216 370/252 |
| 2016/0081010 A1* | 3/2016 | Seok | H04W 74/0816 370/329 |
| 2016/0135142 A1* | 5/2016 | Lee | H04L 1/1671 370/329 |
| 2017/0126363 A1* | 5/2017 | Wang | H04L 1/0061 |
| 2017/0127429 A1 | 5/2017 | Coffey et al. | |
| 2017/0188387 A1* | 6/2017 | Mukherjee | H04W 74/0808 |
| 2017/0325201 A1* | 11/2017 | Chen | H04W 72/1215 |
| 2017/0339721 A1* | 11/2017 | Mukherjee | H04W 16/14 |
| 2019/0082355 A1* | 3/2019 | Ryoo | H04W 24/08 |

FOREIGN PATENT DOCUMENTS

| | | |
|---|---|---|
| CN | 104185298 A | 12/2014 |
| CN | 105050201 A | 11/2015 |
| EP | 0932276 A2 | 7/1999 |
| WO | 2014178678 A1 | 11/2014 |
| WO | 2015113720 A1 | 8/2015 |

OTHER PUBLICATIONS

Foreign Communication From A Counterpart Application, European Application No. 15877427.3, Extended European Search Report dated Mar. 14, 2018, 18 pages.
Machine Translation and Abstract of Chinese Publication No. CN103188711, Jul. 3, 2013, 11 pages.
Machine Translation and Abstract of Chinese Publication No. CN104185298, Dec. 3, 2014, 12 pages.
"3rd Generation Partnership Project; Technical Specification Group Radio Access Network; Study on Licensed-Assisted Access to Unlicensed Spectrum (Release 13)," 3GPP TR 36.889 V0.1.1, Nov. 2014, Technical Report, 40 pages.
Foreign Communication From A Counterpart Application, PCT Application No. PCT/CN2015/070732, English Translation of International Search Report dated Oct. 20, 2015, 2 pages.
Foreign Communication From A Counterpart Application, PCT Application No. PCT/CN2015/070732, English Translation of Written Opinion dated Oct. 20, 2015, 6 pages.
Machine Translation and Abstract of International Publication No. WO2014178678, Nov. 6, 2014, 62 pages.
Foreign Communication From A Counterpart Application, Chinese Application No. 201580066288.5, Chinese Office Action dated Apr. 15, 2019, 8 pages.

* cited by examiner

DATA TRANSMISSION METHOD AND APPARATUS

CROSS-REFERENCE TO RELATED APPLICATION

This application is a U.S. National Stage of International Patent Application No. PCT/CN2015/070732 filed on Jan. 15, 2015, which is hereby incorporated by reference in its entirety.

TECHNICAL FIELD

The present disclosure relates to the communications field, and in particular, to a data transmission method and an apparatus.

BACKGROUND

In a licensed-assisted access using Long Term Evolution (LAA-LTE) system, a device follows a listen before talk (LBT) rule. That is, the device first detects, by means of listening, that a channel resource in an unlicensed spectrum is idle, and then uses the channel resource in the unlicensed spectrum to transmit data. The LAA-LTE system may also be referred to as a Long Term Evolution in unlicensed spectrum (LTE-U) system. LBT is a carrier sense multiple access (CSMA) technology, and an operation mode of the LBT technology includes a load based equipment (LBE) operation mode and a frame based equipment (FBE) operation mode.

In other approaches, a device may transmit data in an LBE operation mode, an FBE operation mode, or a mixture operation mode of an LBE operation mode and an FBE operation mode. When a device in the LAA-LTE system transmits data in the foregoing LBT manner using an unlicensed spectrum, the device may collide with another device such as a WI-FI device when preempting the unlicensed spectrum for simultaneously transmitting data. Afterward, collision may reoccur with a larger probability. However, there is not a method for preventing collision reoccurrence during preemption of an unlicensed spectrum in other approaches.

SUMMARY

Embodiments of the present disclosure provide a data transmission method and an apparatus to effectively reduce a collision reoccurrence probability after a device in an LAA-LTE system preempts an unlicensed spectrum and collides with another device.

To achieve the foregoing objective, the embodiments of the present disclosure use the following technical solutions.

According to a first aspect, a data transmission method is provided, including adjusting, by a first device, a detection moment or a quantity of detection times of clear channel assessment (CCA) of a channel in an unlicensed spectrum after the first device determines that the first device collides with another device when occupying the channel in the unlicensed spectrum to transmit data, and occupying, by the first device according to an adjusted detection moment or an adjusted quantity of detection times of CCA of the channel in the unlicensed spectrum, the channel in the unlicensed spectrum to transmit data.

With reference to the first aspect, in a first possible implementation, adjusting, by a first device, a detection moment or a quantity of detection times of CCA of a channel in an unlicensed spectrum includes randomly adjusting, by the first device, the detection moment or the quantity of detection times of CCA of the channel in the unlicensed spectrum.

With reference to the first aspect, in a second possible implementation, adjusting, by a first device, a detection moment of CCA of a channel in an unlicensed spectrum includes adjusting, by the first device, the detection moment of CCA of the channel in the unlicensed spectrum by increasing or decreasing a data frame length.

With reference to the first aspect, in a third possible implementation, adjusting, by a first device, a detection moment of CCA of a channel in an unlicensed spectrum includes delaying, by the first device, the detection moment of CCA of the channel in the unlicensed spectrum.

With reference to the first aspect, in a fourth possible implementation, adjusting, by a first device, a detection moment of CCA of a channel in an unlicensed spectrum includes adjusting, by the first device, the detection moment of CCA of the channel in the unlicensed spectrum by increasing or decreasing a CCA detection interval.

With reference to the first aspect, in a fifth possible implementation, adjusting, by a first device, a quantity of detection times of CCA of a channel in an unlicensed spectrum includes increasing or decreasing, by the first device, the quantity of detection times of CCA of the channel in the unlicensed spectrum.

With reference to the fifth possible implementation, in a sixth possible implementation, before increasing or decreasing, by the first device, the quantity of detection times of CCA of the channel in the unlicensed spectrum, the method further includes delaying, by the first device, the detection moment of CCA of the channel in the unlicensed spectrum.

With reference to any one of the first aspect, or the first to the sixth possible implementations, in a seventh possible implementation, that the first device determines that the first device collides with another device when occupying the channel in the unlicensed spectrum to transmit data includes obtaining, by the first device, feedback information of transmitted data, and determining, according to the feedback information of the transmitted data, that the first device collides with another device when occupying the channel in the unlicensed spectrum to transmit data.

With reference to the seventh possible implementation, in an eighth possible implementation, the feedback information of the transmitted data is a hybrid automatic repeat request (HARQ), the HARQ includes a negative acknowledgement (NACK) or an acknowledgement (ACK), the NACK is used to indicate that collision occurs in data, and the ACK is used to indicate that no collision occurs in data, or the feedback information of the transmitted data is a request for adjusting the detection moment or the quantity of detection times of CCA of the channel in the unlicensed spectrum.

With reference to any one of the first aspect, or the first to the eighth possible implementations, in a ninth possible implementation, the first device sends the adjusted detection moment or the adjusted quantity of detection times of CCA of the channel in the unlicensed spectrum.

With reference to any one of the first aspect, or the first to the ninth possible implementations, in a tenth possible implementation, if the first device continuously occupies the channel in the unlicensed spectrum X times to transmit data, or the first device continuously fails to occupy the channel in the unlicensed spectrum Y times to transmit data, the adjusted detection moment or the adjusted quantity of detection times of CCA of the channel in the unlicensed spectrum is set to an unadjusted detection moment or an unadjusted quantity of detection times of CCA of the channel in the unlicensed spectrum, where X and Y are positive integers.

With reference to the tenth possible implementation, in an eleventh possible implementation, the unadjusted detection moment or the unadjusted quantity of detection times of CCA of the channel in the unlicensed spectrum is a preset detection moment or a preset quantity of detection times of CCA of the channel in the unlicensed spectrum.

According to a second aspect, a first device is provided, including a processing unit configured to adjust a detection moment or a quantity of detection times of CCA of a channel in an unlicensed spectrum after the first device determines that the first device collides with another device when occupying the channel in the unlicensed spectrum to transmit data, and a transmission unit configured to occupy, according to an adjusted detection moment or an adjusted quantity of detection times of CCA of the channel in the unlicensed spectrum, the channel in the unlicensed spectrum to transmit data.

With reference to the second aspect, in a first possible implementation, the processing unit is further configured to randomly adjust the detection moment or the quantity of detection times of CCA of the channel in the unlicensed spectrum.

With reference to the second aspect, in a second possible implementation, the processing unit is further configured to adjust the detection moment of CCA of the channel in the unlicensed spectrum by increasing or decreasing a data frame length.

With reference to the second aspect, in a third possible implementation, the processing unit is further configured to delay the detection moment of CCA of the channel in the unlicensed spectrum.

With reference to the second aspect, in a fourth possible implementation, the processing unit is further configured to adjust the detection moment of CCA of the channel in the unlicensed spectrum by increasing or decreasing a CCA detection interval.

With reference to the second aspect, in a fifth possible implementation, the processing unit is further configured to increase or decrease the quantity of detection times of CCA of the channel in the unlicensed spectrum.

With reference to the fifth possible implementation, in a sixth possible implementation, the processing unit is further configured to delay the detection moment of CCA of the channel in the unlicensed spectrum.

With reference to the second aspect, or the first to the sixth possible implementations, in a seventh possible implementation, the processing unit is further configured to obtain feedback information of transmitted data, and determine, according to the feedback information of the transmitted data, that the first device collides with another device when occupying the channel in the unlicensed spectrum to transmit data.

With reference to the seventh possible implementation, in an eighth possible implementation, the first device further includes a transmit unit configured to send the adjusted detection moment or the adjusted quantity of detection times of CCA of the channel in the unlicensed spectrum.

With reference to the second aspect, or the first to the eighth possible implementations, in a ninth possible implementation, if the first device continuously occupies the channel in the unlicensed spectrum X times to transmit data, or the first device continuously fails to occupy the channel in the unlicensed spectrum Y times to transmit data, the processing unit is further configured to set the adjusted detection moment or the adjusted quantity of detection times of CCA of the channel in the unlicensed spectrum to an unadjusted detection moment or an unadjusted quantity of detection times of CCA of the channel in the unlicensed spectrum, where X and Y are positive integers.

According to a third aspect, a first device is provided, including a memory configured to store program code, and a processor configured to invoke the program code stored in the memory to perform the method of adjusting a detection moment or a quantity of detection times of CCA of a channel in an unlicensed spectrum after the first device determines that the first device collides with another device when occupying the channel in the unlicensed spectrum to transmit data, where the method performed by the processor further includes occupying, according to an adjusted detection moment or an adjusted quantity of detection times of CCA of the channel in the unlicensed spectrum, the channel in the unlicensed spectrum to transmit data.

With reference to the third aspect, in a first possible implementation, the method performed by the processor includes randomly adjusting the detection moment or the quantity of detection times of CCA of the channel in the unlicensed spectrum.

With reference to the third aspect, in a second possible implementation, the method performed by the processor includes adjusting the detection moment of CCA of the channel in the unlicensed spectrum by increasing or decreasing a data frame length.

With reference to the third aspect, in a third possible implementation, the method performed by the processor includes delaying the detection moment of CCA of the channel in the unlicensed spectrum.

With reference to the third aspect, in a fourth possible implementation, the method performed by the processor includes adjusting the detection moment of CCA of the channel in the unlicensed spectrum by increasing or decreasing a CCA detection interval.

With reference to the third aspect, in a fifth possible implementation, the method performed by the processor includes increasing or decreasing the quantity of detection times of CCA of the channel in the unlicensed spectrum.

With reference to the fifth possible implementation, in a sixth possible implementation, the method performed by the processor further includes delaying the detection moment of CCA of the channel in the unlicensed spectrum.

With reference to the third aspect, or the first to the sixth possible implementations, in a seventh possible implementation, the method performed by the processor includes obtaining feedback information of transmitted data, and determining, according to the feedback information of the transmitted data, that the first device collides with another device when occupying the channel in the unlicensed spectrum to transmit data.

With reference to the seventh possible implementation, in an eighth possible implementation, the first device further includes a transmitter configured to send the adjusted detection moment or the adjusted quantity of detection times of CCA of the channel in the unlicensed spectrum.

With reference to the third aspect, or the first to the eighth possible implementations, in a ninth possible implementation, if the first device continuously occupies the channel in the unlicensed spectrum X times to transmit data, or the first device continuously fails to occupy the channel in the unlicensed spectrum Y times to transmit data, the method performed by the processor further includes setting the adjusted detection moment or the adjusted quantity of detection times of CCA of the channel in the unlicensed spectrum to an unadjusted detection moment or an unadjusted quantity of detection times of CCA of the channel in the unlicensed spectrum, where X and Y are positive integers.

The embodiments of the present disclosure provide a data transmission method and an apparatus. A first device adjusts a detection moment or a quantity of detection times of CCA of a channel in an unlicensed spectrum after the first device determines that the first device collides with another device when occupying the channel in the unlicensed spectrum to transmit data, and occupies, according to an adjusted detection moment or an adjusted quantity of detection times of CCA of the channel in the unlicensed spectrum, the channel in the unlicensed spectrum to transmit data. Therefore, a data transmission competition relationship between devices in which data collision occurs is changed, competition times of the devices in which data collision occurs are different, and a collision reoccurrence probability can be effectively reduced after a device in an LAA-LTE system preempts an unlicensed spectrum and collides with another device.

BRIEF DESCRIPTION OF DRAWINGS

To describe the technical solutions in the embodiments of the present disclosure more clearly, the following briefly describes the accompanying drawings required for describing the embodiments. The accompanying drawings in the following description show merely some embodiments of the present disclosure, and a person of ordinary skill in the art may still derive other drawings from these accompanying drawings without creative efforts.

DESCRIPTION OF EMBODIMENTS

The following clearly and completely describes the technical solutions in the embodiments of the present disclosure with reference to accompanying drawings in the embodiments of the present disclosure. The described embodiments are merely some but not all of the embodiments of the present disclosure. All other embodiments obtained by a person of ordinary skill in the art based on the embodiments of the present disclosure without creative efforts shall fall within the protection scope of the present disclosure.

A first device described in the present disclosure may be a base station or user equipment (UE). The base station or the UE may be an LAA-LTE device in an LAA-LTE system. When the first device is a base station, a second device is UE. When the first device is UE, a second device is a base station. When the first device is UE, a second device may also be UE, and the second device may be a receiving device that receives data sent by the first device. Certainly, the second device may be an LAA-LTE device in the system. A third device may be a device whose data collides with data sent by the first device. The third device may be a WI-FI device, or may be an LAA-LTE device in the system. The first device, the second device, and the third device in the present disclosure are merely used to distinguish from each other, but are not intended to limit the present disclosure.

It should be noted that in the prior art, a spectrum used in a wireless communications system may be divided into a licensed spectrum and an unlicensed spectrum. The licensed spectrum is a spectrum that can be used only after authorization. For example, for a commercial mobile communications system, an operator needs to obtain a permission of the licensed spectrum by means of auction. After obtaining authorization, the operator may carry out a mobile communications operating activity using a corresponding spectrum. The unlicensed spectrum is a spectrum that can be used without authorization, that is, any operator can deploy a device in an unlicensed frequency band without auction, for example, a WI-FI device in a frequency band of 2.4 gigahertz (GHz) and a frequency band of 5 GHz.

Figure 1:
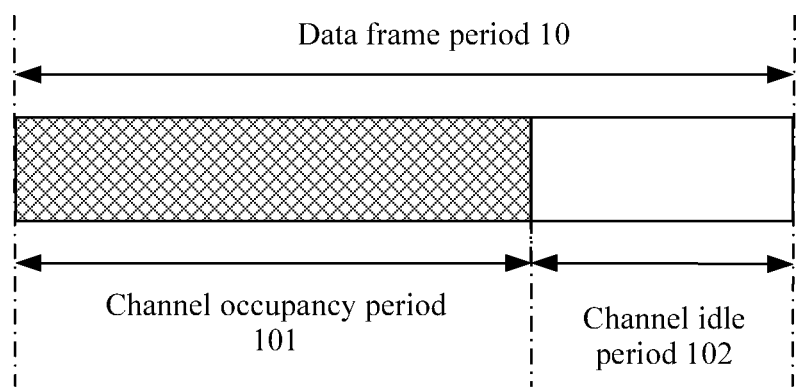
FIG. 1 is a schematic structural diagram of a data frame period of an FBE frame structure.

As shown in FIG. 1, a data frame period 10 of an FBE frame structure includes a channel occupancy period 101 and a channel idle period 102.

Figure 2:
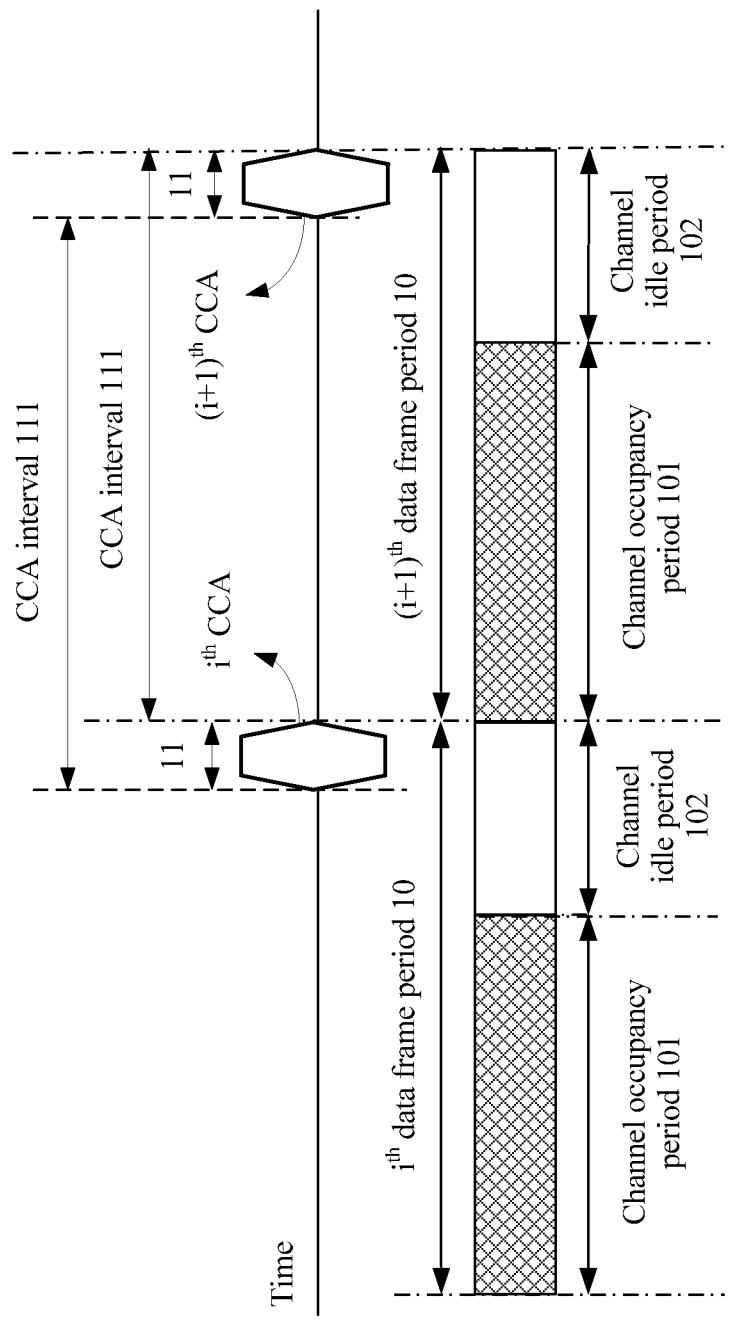
FIG. 2 is a schematic diagram in which a first device uses an FBE operation mode.

When a first device uses an FBE operation mode, as shown in FIG. 2, the first device detects, at the end of a channel idle period 102 of an $i^{th}$ data frame period 10 by means of $i^{th}$ CCA, whether a channel in an unlicensed spectrum in an $(i+1)^{th}$ data frame period 10 is occupied. If the channel in the unlicensed spectrum in the $(i+1)^{th}$ data frame period 10 is idle, the first device occupies the channel in the unlicensed spectrum in a channel occupancy period 101 of the $(i+1)^{th}$ data frame period 10 to transmit data. If the channel in the unlicensed spectrum in the $(i+1)^{th}$ data frame period 10 is occupied, the first device backs off the $(i+1)^{th}$ data frame period 10, and the first device detects, at the end of a channel idle period 102 of the $(i+1)^{th}$ data frame period 10 by means of $(i+1)^{th}$ CCA, whether a channel in an unlicensed spectrum in an $(i+2)^{th}$ data frame period (not shown) is occupied such that the first device occupies the channel in the unlicensed spectrum in the $(i+2)^{th}$ data frame period to transmit data. The CCA detection period 11 is not less than 18 microseconds (μs). A CCA interval 111 is duration between a start time of the $i^{th}$ CCA detection and a start time of the $(i+1)^{th}$ CCA detection. Alternatively, a CCA interval 111 is duration between an end time of the $i^{th}$ CCA detection and an end time of the $(i+1)^{th}$ CCA detection. A channel idle period 102 occupies at least five percent of a data frame period 10.

When a first device uses an LBE operation mode, the first device needs to perform a CCA backoff mechanism before occupying a channel in an unlicensed spectrum to transmit data. The first device randomly selects an integer N from 1 to q as an initial backoff value, where q may be referred to as a preset backoff threshold of the first device, and q is a preset positive integer greater than 1. If the first device determines, when performing CCA detection, that the channel in the unlicensed spectrum is idle, the initial backoff value N is decreased by 1. If the first device determines, when performing CCA detection, that the channel in the unlicensed spectrum is occupied, the backoff value remains unchanged. A backoff value determined after CCA detection is performed each time may be referred to as a current backoff value ($N_c$), and the first device does not occupy the channel in the unlicensed spectrum to transmit data until the $N_c$ is decreased to 0. A process in which the first device progressively decreases the initial backoff value according to the initial backoff value by means of CCA detection may be referred to as CCA backoff.

Figure 3:
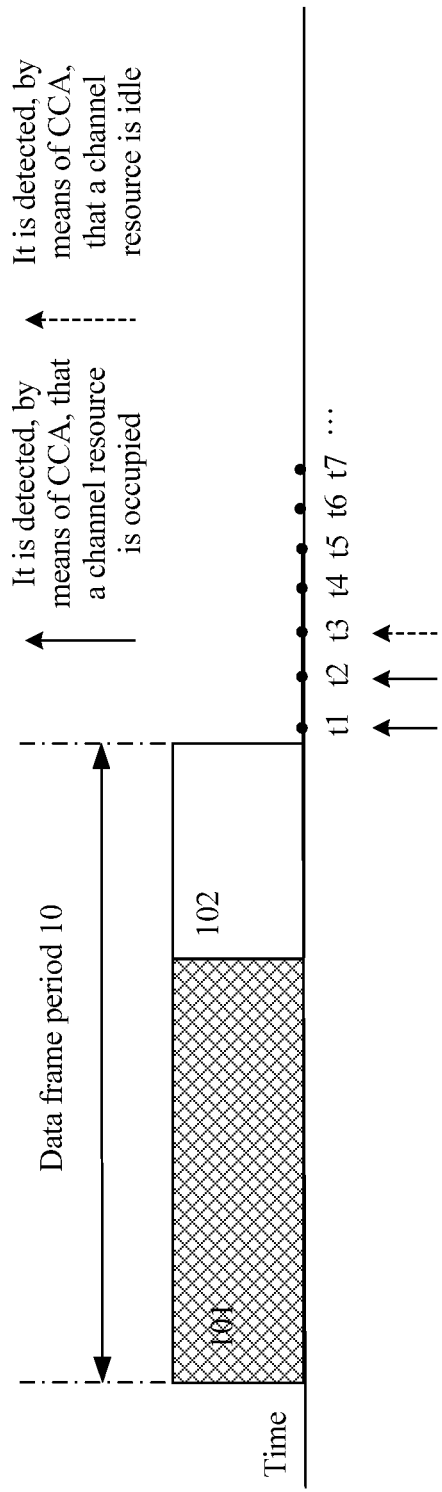
FIG. 3 is a schematic diagram in which a first device uses a first mixture operation mode of an FBE operation mode and an LBE operation mode.

When a first device uses a first mixture operation mode of an FBE operation mode and an LBE operation mode, after the first device occupies a channel in an unlicensed spectrum in a channel occupancy period to transmit data, the first device detects the channel in the unlicensed spectrum according to a CCA interval or a preset moment by means of CCA. A probability of occupying a channel in an unlicensed spectrum in FBE may be improved by improving a frequency of CCA detection, shortening a CCA detection period, or shortening a CCA interval. Two CCA intervals may be different. As shown in FIG. 3, after a first device occupies a channel in an unlicensed spectrum in a channel occupancy period 101 of a data frame period 10 to transmit data, the first device detects the channel in the unlicensed spectrum by means of CCA at moments t1, t2, and t3. If the first device detects that the channel in the unlicensed spectrum is idle, the first device occupies the channel in the unlicensed spectrum to transmit data. If the first device detects that the channel in the unlicensed spectrum is occupied, the first device backs off M CCA detection periods, and the first device does not occupy the channel in the unlicensed spectrum to transmit data until an $N_c$ is decreased to 0 at the moment t3. Particularly, M is equal to 1. A solid line with an arrow indicates that it is detected, by means of CCA, that the channel in the unlicensed spectrum is occupied, and a dotted line with an arrow indicates that it is detected, by means of CCA, that the channel in the unlicensed spectrum is idle. It should be noted that the first device may detect the channel in the unlicensed spectrum by means of CCA in a channel idle period 102 after the channel occupancy period 101 ends, that is, the moment t1 is in the channel idle period 102.

Figure 4:
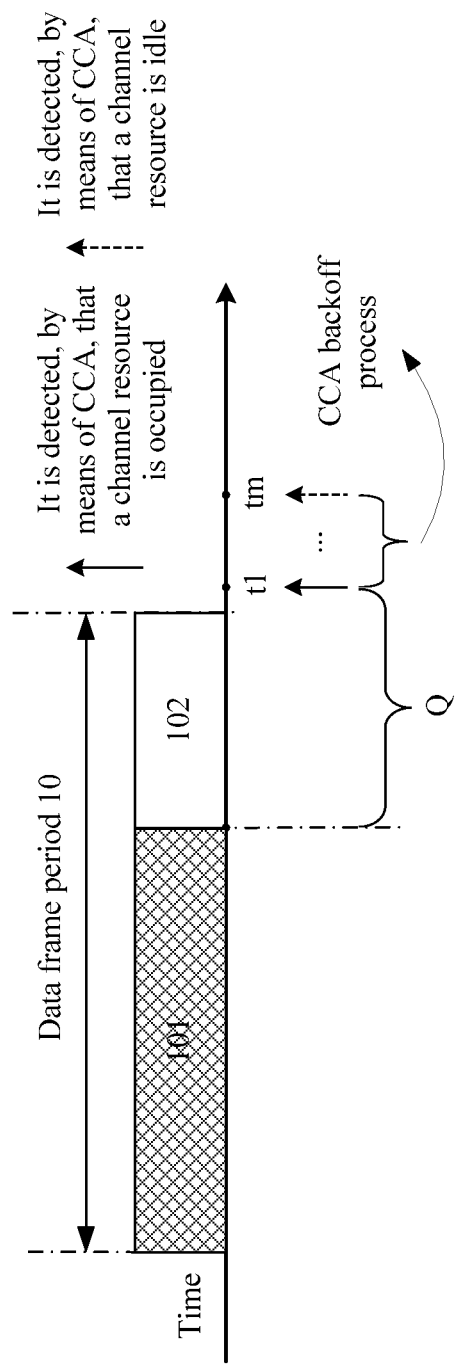
FIG. 4 is a schematic diagram in which a first device uses a second mixture operation mode of an FBE operation mode and an LBE operation mode.

When a first device uses a second mixture operation mode of an FBE operation mode and an LBE operation mode, as shown in FIG. 4, the first device occupies a channel in an unlicensed spectrum in a channel occupancy period 101 of a data frame period 10 to transmit data. After a channel resource is released, the first device frees up (off) the channel for Q timeslots according to an idle value Q, and a WI-FI device or another device in an LAA-LTE system may use the channel in the unlicensed spectrum to transmit data. After the channel is freed for Q timeslots, the first device uses an LBE CCA backoff mechanism or randomly selects a value a. A solid line with an arrow indicates that it is detected, by means of CCA, that the channel in the unlicensed spectrum is occupied, and a dotted line with an arrow indicates that it is detected, by means of CCA, that the channel in the unlicensed spectrum is idle. When the channel in the unlicensed spectrum is occupied, the value a remains unchanged. However, when the channel in the unlicensed spectrum is idle, the value a is progressively decreased. The first device does not occupy the channel in the unlicensed spectrum to transmit data until the value a is decreased to 0. It should be noted that the value Q may be duration of occupying the channel in the unlicensed spectrum by the first device, for example, may be 10 milliseconds, or may be a random value, such as a random value randomly selected in a range of [1, 10] milliseconds. However, the value Q is less than or equal to the duration occupied by the data frame period of the first device.

Collision described in the present disclosure may be data collision occurred when devices in an LAA-LTE system transmit data in the foregoing LBT manner using a channel in a same unlicensed spectrum, or may be data collision occurred when a device in an LAA-LTE system and a WI-FI device transmit data using a channel in a same unlicensed spectrum at a same moment, where the device in the LAA-LTE system transmits data in the foregoing LBT manner. After a device in the LAA-LTE system preempts an unlicensed spectrum and collides with another device, a specific method for effectively reducing a collision reoccurrence probability is described in the following embodiments.

Figure 5:
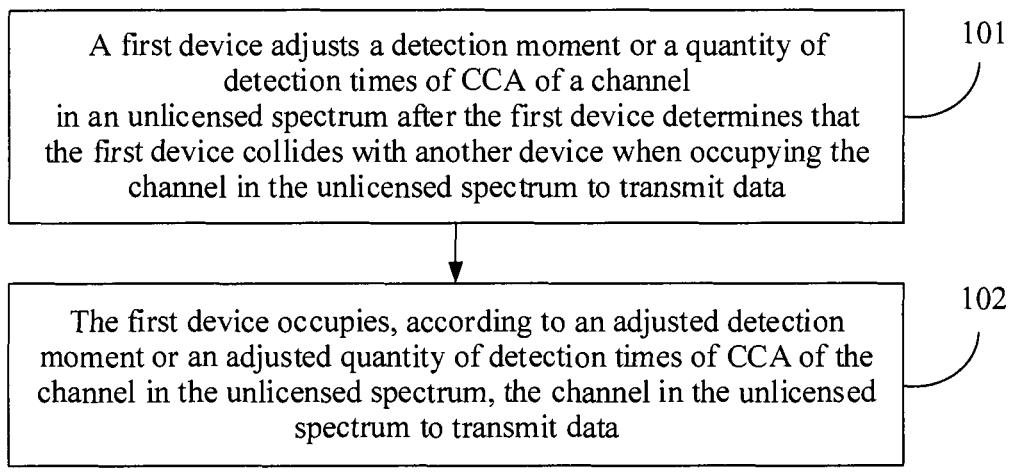
FIG. 5 is a flowchart of a data transmission method according to an embodiment of the present disclosure.

An embodiment of the present disclosure provides a data transmission method. As shown in FIG. 5, the method includes the following steps.

Step 101: A first device adjusts a detection moment or a quantity of detection times of CCA of a channel in an unlicensed spectrum after the first device determines that the first device collides with another device when occupying the channel in the unlicensed spectrum to transmit data.

Step 102: The first device occupies, according to an adjusted detection moment or an adjusted quantity of detection times of CCA of the channel in the unlicensed spectrum, the channel in the unlicensed spectrum to transmit data.

In this way, a first device adjusts a detection moment or a quantity of detection times of CCA of a channel in an unlicensed spectrum after the first device determines that the first device collides with another device when occupying the channel in the unlicensed spectrum to transmit data, and occupies, according to an adjusted detection moment or an adjusted quantity of detection times of CCA of the channel in the unlicensed spectrum, the channel in the unlicensed spectrum to transmit data. Therefore, a data transmission competition relationship between devices in which data collision occurs is changed, competition times of the devices in which data collision occurs are different, and a collision reoccurrence probability can be effectively reduced after a device in an LAA-LTE system preempts an unlicensed spectrum and collides with another device.

Further, that the first device determines that the first device collides with another device when occupying the channel in the unlicensed spectrum to transmit data includes that the first device obtains feedback information of transmitted data, and the first device determines whether the feedback information of the transmitted data is greater than or equal to a preset collision threshold of transmitted data, where the feedback information of the transmitted data is multiple pieces of feedback information that are of transmitted data and that are obtained by the first device. If the first device determines that the feedback information of the transmitted data is greater than or equal to the preset collision threshold of transmitted data, the first device adjusts the channel in the unlicensed spectrum competed by the first device. If the first device determines that the feedback information of the transmitted data is less than the preset collision threshold of transmitted data, the first device does not need to adjust the channel in the unlicensed spectrum competed by the first device.

The feedback information of the transmitted data is an HARQ. The HARQ includes a NACK or an ACK. The NACK is used to indicate collision occurs in data, and the ACK is used to indicate no collision occurs in data. Alternatively, the feedback information of the transmitted data is a request for adjusting the detection moment or the quantity of detection times of CCA of the channel in the unlicensed spectrum. The collision threshold of transmitted data is used to indicate a quantity of feedback information that is received after data collision occurs and that is of transmitted data in which data collision occurs. Optionally, the collision threshold of transmitted data may be used to indicate a ratio, to a quantity of receiving devices, of a quantity of feedback information that is received after data collision occurs and that is of transmitted data in which data collision occurs. Preferably, the collision threshold of transmitted data is used to indicate a ratio, to a quantity of received feedback information of total transmitted data, of a quantity of feedback information that is received after data collision occurs and that is of transmitted data in which data collision occurs. The feedback information of total transmitted data includes feedback information of transmitted data in which data collision occurs and feedback information of transmitted data in which data collision does not occur, where the two types of feedback information are received after data collision occurs.

It should be noted that, multiple devices in an LAA-LTE system may be scheduled in a data frame period. Therefore, it cannot be determined, according to an HARQ feedback of one device, that data collision occurs, and it may be determined, according to HARQ feedbacks of multiple devices, that data collision occurs in the data frame period. For example, all devices in a data frame period feedback NACKs or requests for adjusting the detection moment or the quantity of detection times of CCA of the channel in the unlicensed spectrum. If some devices in a data frame period feedback NACKs or requests for adjusting the detection moment or the quantity of detection times of CCA of the channel in the unlicensed spectrum, it may be determined that data collision occurs in a part of data in the data frame period. In this case, a retransmission mechanism may be used to retransmit the part of data to a corresponding device.

Further, adjusting the detection moment or the quantity of detection times of CCA of the channel in the unlicensed spectrum may be understood as randomly adjusting the detection moment or the quantity of detection times of CCA of the channel in the unlicensed spectrum. The first device adjusts the detection moment of CCA of the channel in the unlicensed spectrum by increasing or decreasing a data frame length, delays the detection moment of CCA of the channel in the unlicensed spectrum, adjusts the detection moment of CCA of the channel in the unlicensed spectrum by increasing or decreasing a CCA detection interval, or delays the detection moment of CCA of the channel in the unlicensed spectrum, and increases or decreases the quantity of detection times of CCA of the channel in the unlicensed spectrum.

It should be noted that the first device sends the adjusted detection moment or the adjusted quantity of detection times of CCA of the channel in the unlicensed spectrum. If the first device continuously occupies the channel in the unlicensed spectrum X times to transmit data, or the first device continuously fails to occupy the channel in the unlicensed spectrum Y times to transmit data, the adjusted detection moment or the adjusted quantity of detection times of CCA of the channel in the unlicensed spectrum is set to an unadjusted detection moment or an unadjusted quantity of detection times of CCA of the channel in the unlicensed spectrum, where X and Y are positive integers. The unadjusted detection moment or the unadjusted quantity of detection times of CCA of the channel in the unlicensed spectrum is a preset detection moment or a preset quantity of detection times of CCA of the channel in the unlicensed spectrum.

Figure 6:
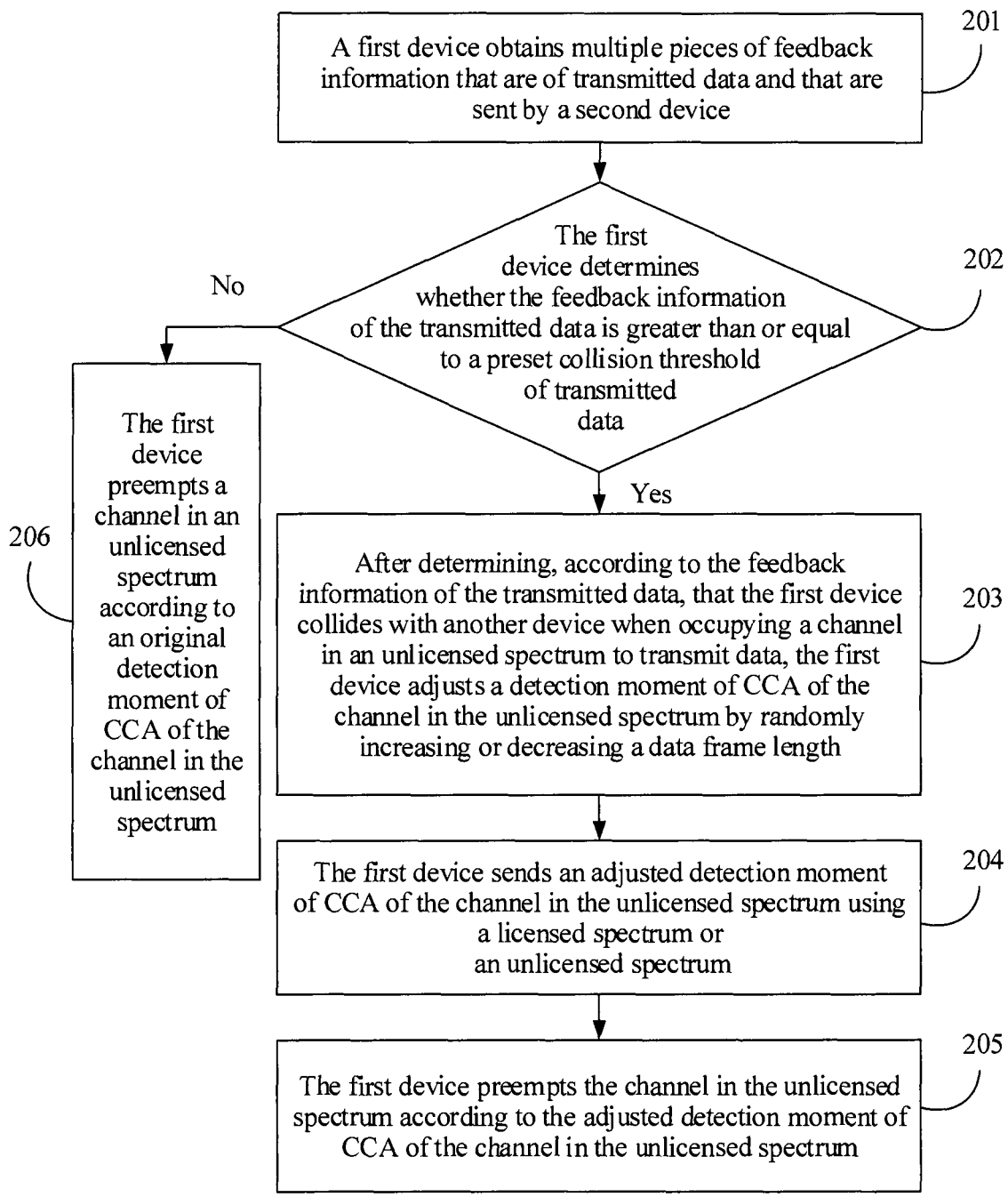
FIG. 6 is a flowchart of another data transmission method according to an embodiment of the present disclosure.

An embodiment of the present disclosure provides a data transmission method. It is assumed that data collision occurs when a first device uses an FBE operation mode. As shown in FIG. 6, the method includes the following steps.

Step 201: A first device obtains multiple pieces of feedback information that are of transmitted data and that are sent by a second device.

Step 202: The first device determines whether the feedback information of the transmitted data is greater than or equal to a preset collision threshold of transmitted data.

If the first device determines that the feedback information of the transmitted data is greater than or equal to the preset collision threshold of transmitted data, step 203 is performed.

If the first device determines that the feedback information of the transmitted data is less than the preset collision threshold of transmitted data, step 206 is performed.

Step 203: After determining, according to the feedback information of the transmitted data, that the first device collides with another device when occupying a channel in an unlicensed spectrum to transmit data, the first device adjusts a detection moment of CCA of the channel in the unlicensed spectrum by randomly increasing or decreasing a data frame length.

Figure 7:
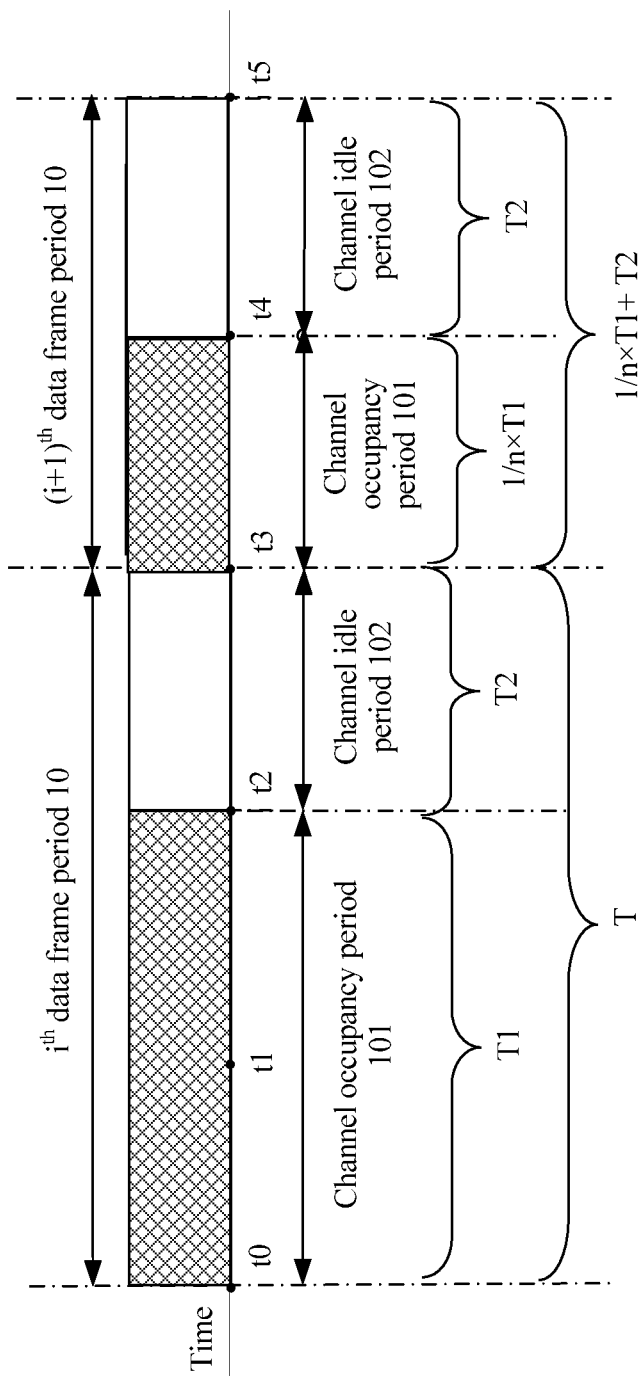
FIG. 7 is a schematic diagram in which a first device uses an FBE operation mode according to an embodiment of the present disclosure.

For example, as shown in FIG. 7, it is assumed that the first device occupies a channel in an unlicensed spectrum in a channel occupancy period 101 of an $i^{th}$ data frame period 10 to transmit data. The $i^{th}$ data frame period 10 is T milliseconds, that is, duration between t0 and t3 shown in FIG. 7. Particularly, the $i^{th}$ data frame period 10 may be 10 milliseconds. The channel occupancy period 101 of the $i^{th}$ data frame period 10 is T1 milliseconds, that is, duration between t0 and t2 shown in FIG. 7. A channel idle period 102 of the $i^{th}$ data frame period 10 is T2 milliseconds, that is, duration between t2 and t3 shown in FIG. 7. After obtaining feedback information of transmitted data, the first device may decrease a channel occupancy period 101 of an $(i+1)^{th}$ data frame period 10 to 1/n of the channel occupancy period 101 of the $i^{th}$ data frame period 10. Therefore, the channel occupancy period 101 is 1/n×T1 milliseconds, that is, duration between t3 and t4 shown in FIG. 7. A channel idle period 102 of the $(i+1)^{th}$ data frame period 10 is still T2 milliseconds, that is, duration between t4 and t5 shown in FIG. 7. The $(i+1)^{th}$ data frame period 10 is 1/n*T1+T2.

Figure 8:
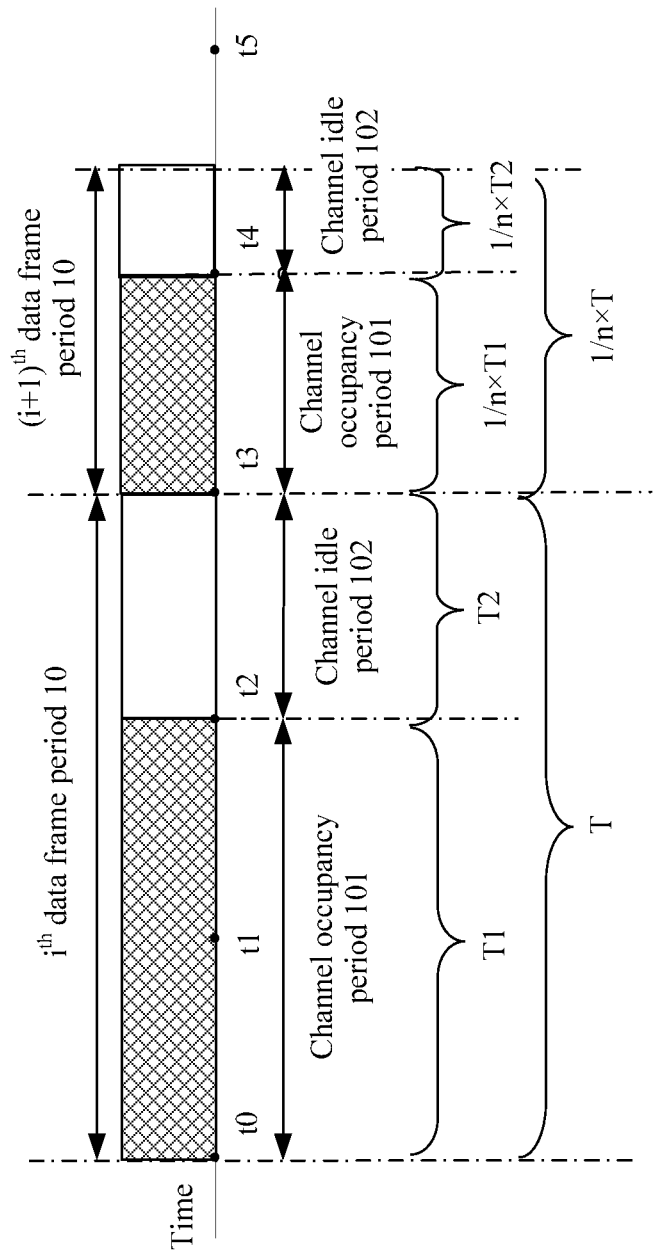
FIG. 8 is another schematic diagram in which a first device uses an FBE operation mode according to an embodiment of the present disclosure.

As shown in FIG. 8, it is assumed that the first device occupies a channel in an unlicensed spectrum in a channel occupancy period 101 of an $i^{th}$ data frame period 10 to transmit data. The $i^{th}$ data frame period 10 is T milliseconds, that is, duration between t0 and t3 shown in FIG. 8, and may be 10 milliseconds. The channel occupancy period 101 of the $i^{th}$ data frame period 10 is T1 milliseconds, that is, duration between t0 and t2 shown in FIG. 8. A channel idle period 102 of the $i^{th}$ data frame period 10 is T2 milliseconds, that is, duration between t2 and t3 shown in FIG. 8. After obtaining feedback information of transmitted data, the first device may decrease an $(i+1)^{th}$ data frame period 10 to 1/n of the $i^{th}$ data frame period 10. Therefore, the $(i+1)^{th}$ data frame period 10 is 1/n×T milliseconds, that is, the first device decreases a channel occupancy period 101 to 1/n of the channel occupancy period 101 of the $i^{th}$ data frame period 10, and decreases a channel idle period 102 to 1/n of the channel idle period 102 of the $i^{th}$ data frame period 10. Therefore, the channel occupancy period 101 of the $(i+1)^{th}$ data frame period 10 is 1/n×T1 milliseconds, and the channel idle period 102 of the $(i+1)^{th}$ data frame period 10 is 1/n×T2 milliseconds. It should be noted that, when a data frame period is decreased, a delay of transmitting data by the first device may be decreased, and all devices can transmit data faster.

Likewise, after obtaining feedback information of transmitted data, the first device may increase an $(i+1)^{th}$ data frame period 10 to m times of the $i^{th}$ data frame period 10. Therefore, the $(i+1)^{th}$ data frame period 10 is m×T milliseconds. Alternatively, the first device may increase a channel occupancy period 101 of an $(i+1)^{th}$ data frame period 10 to m times of the channel occupancy period 101 of the $i^{th}$ data frame period 10. Therefore, the channel occupancy period 101 of the $(i+1)^{th}$ data frame period 10 is m×T1 milliseconds. A method for changing a length of a data frame period or a channel occupancy period is not limited in the present disclosure.

Herein, m may be equal or unequal to n. A decrease time n and an increase time m are random numbers in [1, w]. A maximum value w may be progressively increased according to a quantity of collision times. For example, after data collision first occurs in the first device, w is equal to 2. After data collision occurs in the first device the second time, w is equal to 4. After data collision occurs in the first device the third time, w is equal to 6.

Further, to ensure fairness of transmitting data by the first device, after the first device continuously occupies the channel in the unlicensed spectrum X times to transmit data, or the first device continuously fails to occupy the channel in the unlicensed spectrum Y times to transmit data, the first device may further restore an adjusted maximum value w to any maximum value w that is not adjusted. For example, when w is equal to 6, after the first device continuously occupies the channel in the unlicensed spectrum X times to transmit data, or continuously fails to occupy the channel in the unlicensed spectrum Y times to transmit data, the first device resets w to 2. Particularly, w may be further reset to an initial value 1. Both X and Y are positive integers, and may be set by a system (for example, set by the first device, set by a receiving device, or set by a third-party device) or may be randomly generated.

Step 204: The first device sends an adjusted detection moment of CCA of the channel in the unlicensed spectrum using a licensed spectrum or an unlicensed spectrum.

The first device may send the adjusted detection moment of CCA of the channel in the unlicensed spectrum to UE or a base station using a licensed spectrum or a licensed-assisted spectrum.

Step 205: The first device preempts the channel in the unlicensed spectrum according to the adjusted detection moment of CCA of the channel in the unlicensed spectrum.

Step 206: The first device preempts a channel in an unlicensed spectrum according to an original detection moment of CCA of the channel in the unlicensed spectrum.

In this way, a first device obtains feedback information of transmitted data, and after determining, according to the feedback information of the transmitted data, that data collision occurs in data that is transmitted by the first device by occupying a channel in an unlicensed spectrum, the first device adjusts a detection moment of CCA of the channel in the unlicensed spectrum by randomly increasing or decreasing a data frame length such that first devices stagger data transmission in a time domain as far as possible, and adjust moments of a channel in an unlicensed spectrum competed by the first devices. Therefore, a competition relationship between the first device and a first device that collides with the first device in terms of data is changed, competition times of first devices in which data collision occurs are different, and a collision reoccurrence probability can be effectively reduced after a device in an LAA-LTE system preempts an unlicensed spectrum and collides with another device.

Figure 9:
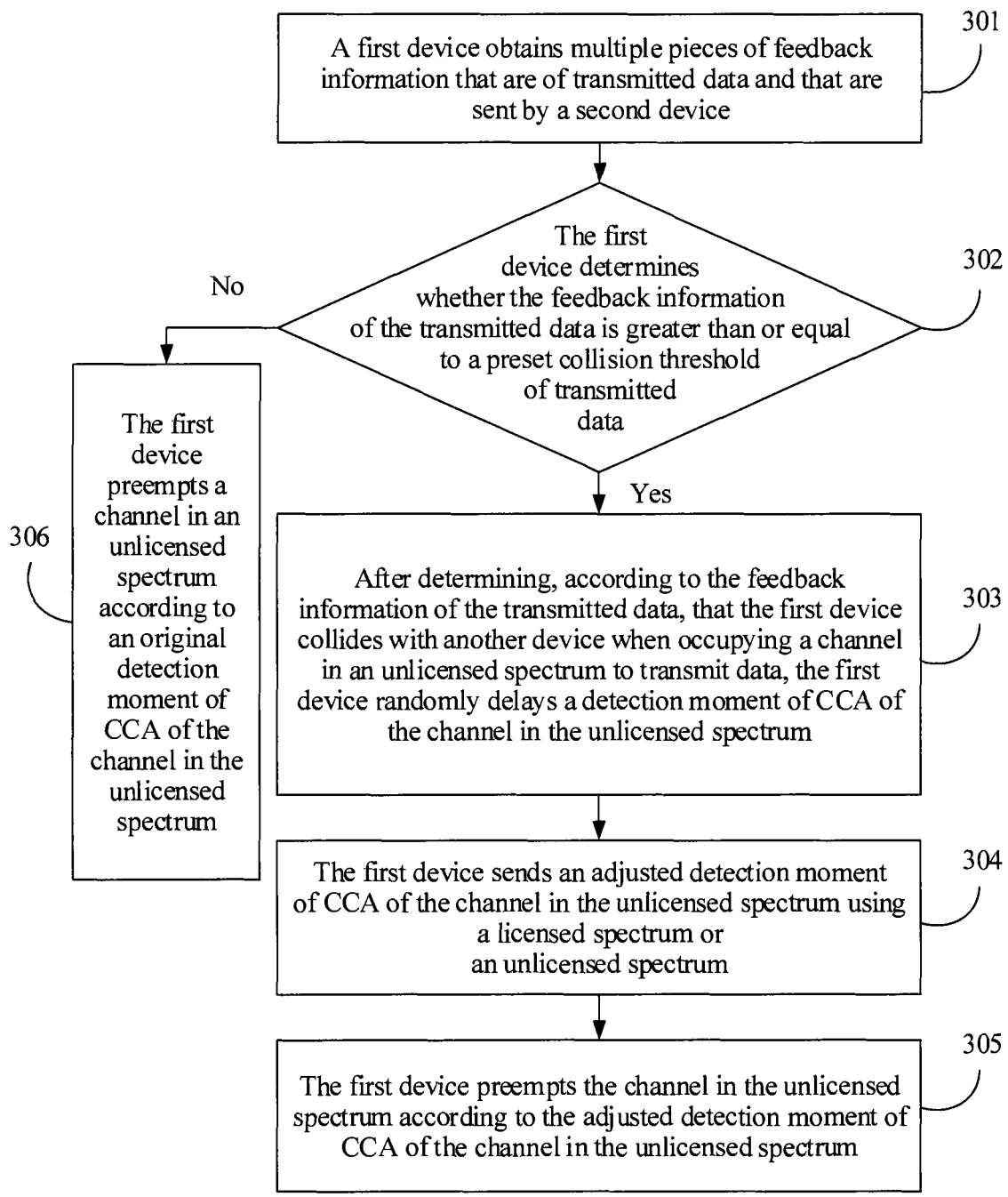
FIG. 9 is a flowchart of still another data transmission method according to an embodiment of the present disclosure.

An embodiment of the present disclosure provides a data transmission method. It is assumed that data collision occurs when a first device uses an FBE operation mode. As shown in FIG. 9, the method includes the following steps.

Step 301: A first device obtains multiple pieces of feedback information that are of transmitted data and that are sent by a second device.

Step 302: The first device determines whether the feedback information of the transmitted data is greater than or equal to a preset collision threshold of transmitted data.

If the first device determines that the feedback information of the transmitted data is greater than or equal to the preset collision threshold of transmitted data, step 303 is performed.

If the first device determines that the feedback information of the transmitted data is less than the preset collision threshold of transmitted data, step 306 is performed.

Step 303: After determining, according to the feedback information of the transmitted data, that the first device collides with another device when occupying a channel in an unlicensed spectrum to transmit data, the first device randomly delays a detection moment of CCA of the channel in the unlicensed spectrum.

Figure 10:
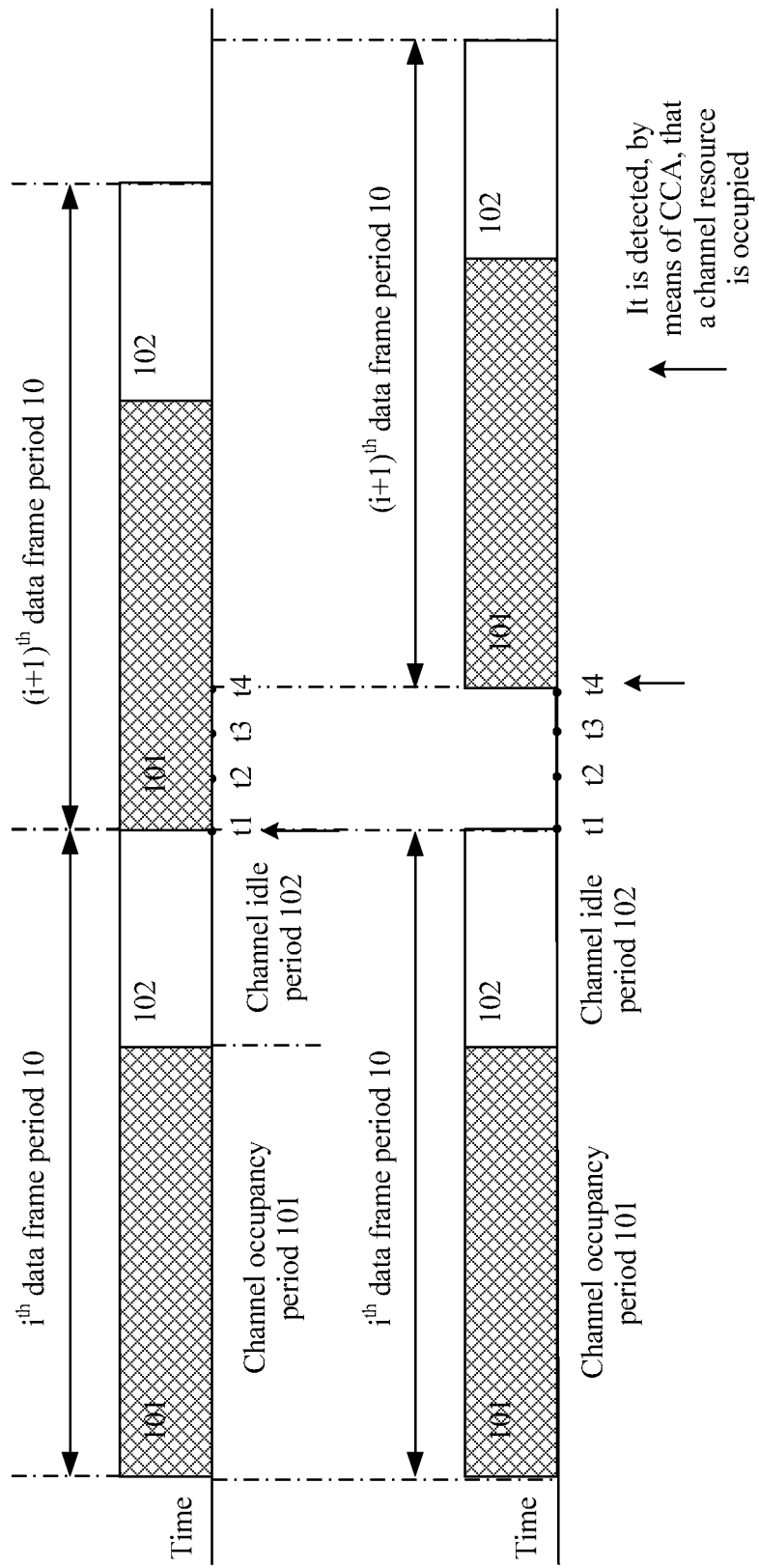
FIG. 10 is still another schematic diagram in which a first device uses an FBE operation mode according to an embodiment of the present disclosure.

For example, as shown in FIG. 10, an $i^{th}$ data frame period 10 includes a channel occupancy period 101 and a channel idle period 102. It is assumed that the first device occupies a channel in an unlicensed spectrum in the channel occupancy period 101 of the $i^{th}$ data frame period 10 to transmit data, and then may detect a channel in an unlicensed spectrum in an $(i+1)^{th}$ data frame period 10 at an end moment t1 of the channel idle period 102 by means of CCA. However, after determining, according to obtained feedback information of transmitted data, that data collision occurs in the data that is transmitted by the first device by occupying the channel in the unlicensed spectrum in the $i^{th}$ data frame period 10, the first device may delay, to a moment t4, a moment of detecting the channel in the unlicensed spectrum in the $(i+1)^{th}$ data frame period 10 by means of CCA. In actual application, z subframes, z timeslots, z orthogonal frequency division multiplexing (OFDM) symbols, or a multiple of z sampling time intervals (Ts) may be delayed such that a moment of detecting a channel in an unlicensed spectrum in a data frame period by means of CCA is not an end moment of a channel idle period of a data frame period. Particularly, the multiple of z Ts may be z 624x Ts.

A delay time z is a random number in [0, w]. A maximum value w may be progressively increased after collision occurs each time. For example, w is equal to 2r, and r is a quantity of collision times. The maximum value of w may be set according to a specific condition, for example, w=256. A value of w and a progressive increase method are not limited in the present disclosure.

Further, to ensure fairness of transmitting data by the first device, after the first device continuously occupies the channel in the unlicensed spectrum X times to transmit data, or the first device continuously fails to occupy the channel in the unlicensed spectrum Y times to transmit data, the first device may further restore an adjusted maximum value w to any maximum value w that is not adjusted. For example, when w is equal to 6, after the first device continuously occupies the channel in the unlicensed spectrum X times to transmit data, or continuously fails to occupy the channel in the unlicensed spectrum Y times to transmit data, the first device resets w to 2. Particularly, w may be further reset to an initial value 0. Both X and Y are positive integers, and may be set by a system (for example, set by the first device, set by a receiving device, or set by a third-party device) or may be randomly generated.

It should be noted that, because a data frame period or a channel occupancy period is not adjusted, the first device presets only a moment at which data may be sent after data collision occurs, for example, a start moment of subframes or a start moment of OFDM symbols. A receiving device detects a channel signal at the moment at which data may be sent, and then can complete receiving.

Step 304: The first device sends an adjusted detection moment of CCA of the channel in the unlicensed spectrum using a licensed spectrum or an unlicensed spectrum.

Step 305: The first device preempts the channel in the unlicensed spectrum according to the adjusted detection moment of CCA of the channel in the unlicensed spectrum.

Step 306: The first device preempts a channel in an unlicensed spectrum according to an original detection moment of CCA of the channel in the unlicensed spectrum.

In this way, a first device obtains feedback information of transmitted data, and after determining, according to the feedback information of the transmitted data, that data collision occurs in data that is transmitted by the first device by occupying a channel in an unlicensed spectrum, the first device randomly delays a detection moment of CCA of the channel in the unlicensed spectrum such that first devices stagger data transmission in a time domain as far as possible, and adjust moments of a channel in an unlicensed spectrum competed by the first devices. Therefore, a competition relationship between the first device and a first device that collides with the first device in terms of data is changed, competition times of first devices in which data collision occurs are different, and a collision reoccurrence probability can be effectively reduced after a device in an LAA-LTE system preempts an unlicensed spectrum and collides with another device.

Figure 11:
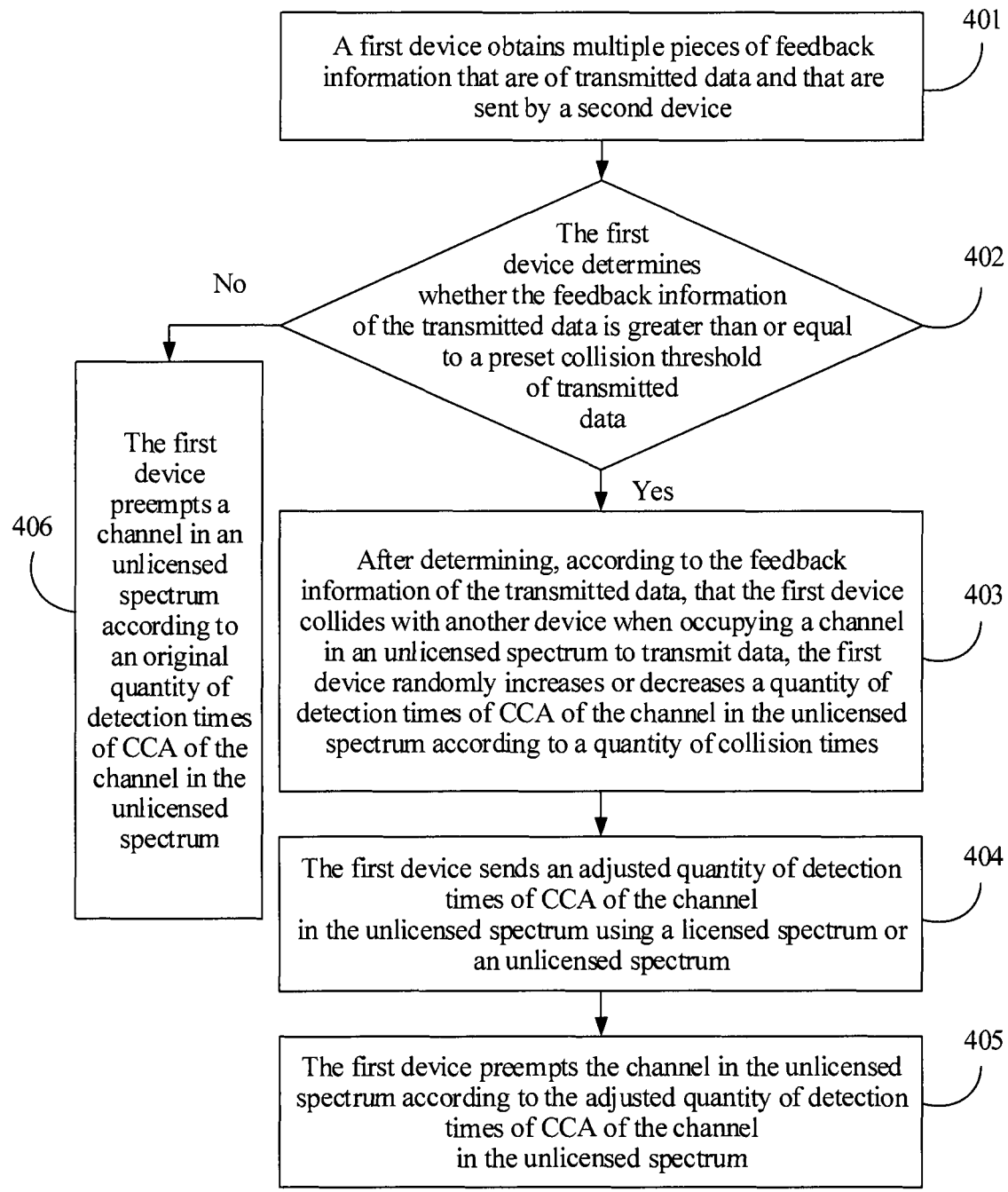
FIG. 11 is a flowchart of yet another data transmission method according to an embodiment of the present disclosure.

An embodiment of the present disclosure provides a data transmission method. It is assumed that data collision occurs when a first device uses an LBE operation mode. As shown in FIG. 11, the method includes the following steps.

Step 401: A first device obtains multiple pieces of feedback information that are of transmitted data and that are sent by a second device.

Step 402: The first device determines whether the feedback information of the transmitted data is greater than or equal to a preset collision threshold of transmitted data.

If the first device determines that the feedback information of the transmitted data is greater than or equal to the preset collision threshold of transmitted data, step 403 is performed.

If the first device determines that the feedback information of the transmitted data is less than the preset collision threshold of transmitted data, step 406 is performed.

Step 403: After determining, according to the feedback information of the transmitted data, that the first device collides with another device when occupying a channel in an unlicensed spectrum to transmit data, the first device randomly increases or decreases a quantity of detection times of CCA of the channel in the unlicensed spectrum according to a quantity of collision times.

For example, after determining, according to obtained feedback information of transmitted data, that data collision occurs in data that is transmitted by the first device by occupying a channel in an unlicensed spectrum in an $i^{th}$ data frame period, the first device may randomly increase or decrease a value q in an LBE CCA backoff mechanism according to a quantity of collision times. It is assumed that an initial value of the value q in the CCA backoff mechanism is q1. When the value q in the LBE CCA backoff mechanism is randomly increased, the value q may be set to q=q1×r, and r is obtained after the quantity of collision times is increased by 1. When the value q in the LBE CCA backoff mechanism is randomly decreased, the value q may be set to q=1/r×q1.

It should be noted that, when the value q in the LBE CCA backoff mechanism is randomly increased, if an increased value q is greater than a maximum value, the maximum value is used as the increased value q. When the value q in the LBE CCA backoff mechanism is randomly decreased, if a decreased value q is less than a minimum value, the minimum value is used as the decreased value q. A maximum value of the value q may be 32, and a minimum value of the value q may be 4. The maximum value of the value q and the minimum value of the value q are not limited in the present disclosure.

An initial backoff value N in the CCA backoff mechanism may be randomly selected from [1, q]. The first device performs the CCA backoff mechanism according to the initial backoff value N, and does not transmit data until an $N_c$ is 0. Particularly, a channel occupancy period may be related to the value q. For example, the channel occupancy period is (13/32)×q milliseconds. In this case, a data frame period changes when the value q is adjusted. A specific manner of adjusting a value q in a CCA backoff mechanism is not limited in the present disclosure.

After the first device adjusts the value q, the first device randomly selects an initial backoff value N from [1, q]. It is assumed that the initial backoff value N is greater than an initial backoff value N existing before the first device adjusts the value q. Because backoff duration is N×CCA detection period, the backoff duration may be adjusted according to the initial backoff value N that is randomly selected after the first device adjusts the value q. For example, it is assumed that the value q is 30. If the initial backoff value N existing before the first device adjusts the value q is 2, the backoff duration is 2×CCA detection period. The first device adjusts the value q to 60, the first device randomly selects the initial backoff value N from [1, 60] after the first device adjusts the value q, and if the initial backoff value N obtained after the first device adjusts the value q is 6, the backoff duration is 6×CCA detection period.

Further, to ensure fairness of transmitting data by the first device, after the first device continuously occupies the channel in the unlicensed spectrum X times to transmit data, or the first device continuously fails to occupy the channel in the unlicensed spectrum Y times to transmit data, the first device may further restore an adjusted value q to any value q that is not adjusted. For example, when q is equal to q1×6, after the first device continuously occupies the channel in the unlicensed spectrum X times to transmit data, or continuously fails to occupy the channel in the unlicensed spectrum Y times to transmit data, the first device resets the value q to q1×3. Particularly, the value q may be further reset to q1. Both X and Y are positive integers, and may be set by a system (for example, set by the first device, set by a receiving device, or set by a third-party device) or may be randomly generated.

Step 404: The first device sends an adjusted quantity of detection times of CCA of the channel in the unlicensed spectrum using a licensed spectrum or an unlicensed spectrum.

The first device may send an adjusted value q or adjusted backoff duration in the CCA backoff mechanism to UE or a base station using a licensed spectrum or a licensed-assisted spectrum.

Step 405: The first device preempts the channel in the unlicensed spectrum according to the adjusted quantity of detection times of CCA of the channel in the unlicensed spectrum.

Step 406: The first device preempts a channel in an unlicensed spectrum according to an original quantity of detection times of CCA of the channel in the unlicensed spectrum.

In this way, a first device obtains feedback information of transmitted data, and after determining, according to the feedback information of the transmitted data, that data collision occurs in data that is transmitted by the first device by occupying a channel in an unlicensed spectrum, the first device randomly increases or decreases a quantity of detection times of CCA of the channel in the unlicensed spectrum according to a quantity of collision times such that first devices stagger data transmission in a time domain as far as possible, and adjust moments of a channel in an unlicensed spectrum competed by the first devices. Therefore, a competition relationship between the first device and a first device that collides with the first device in terms of data is changed, competition times of first devices in which data collision occurs are different, and a collision reoccurrence probability can be effectively reduced after a device in an LAA-LTE system preempts an unlicensed spectrum and collides with another device.

Figure 12:
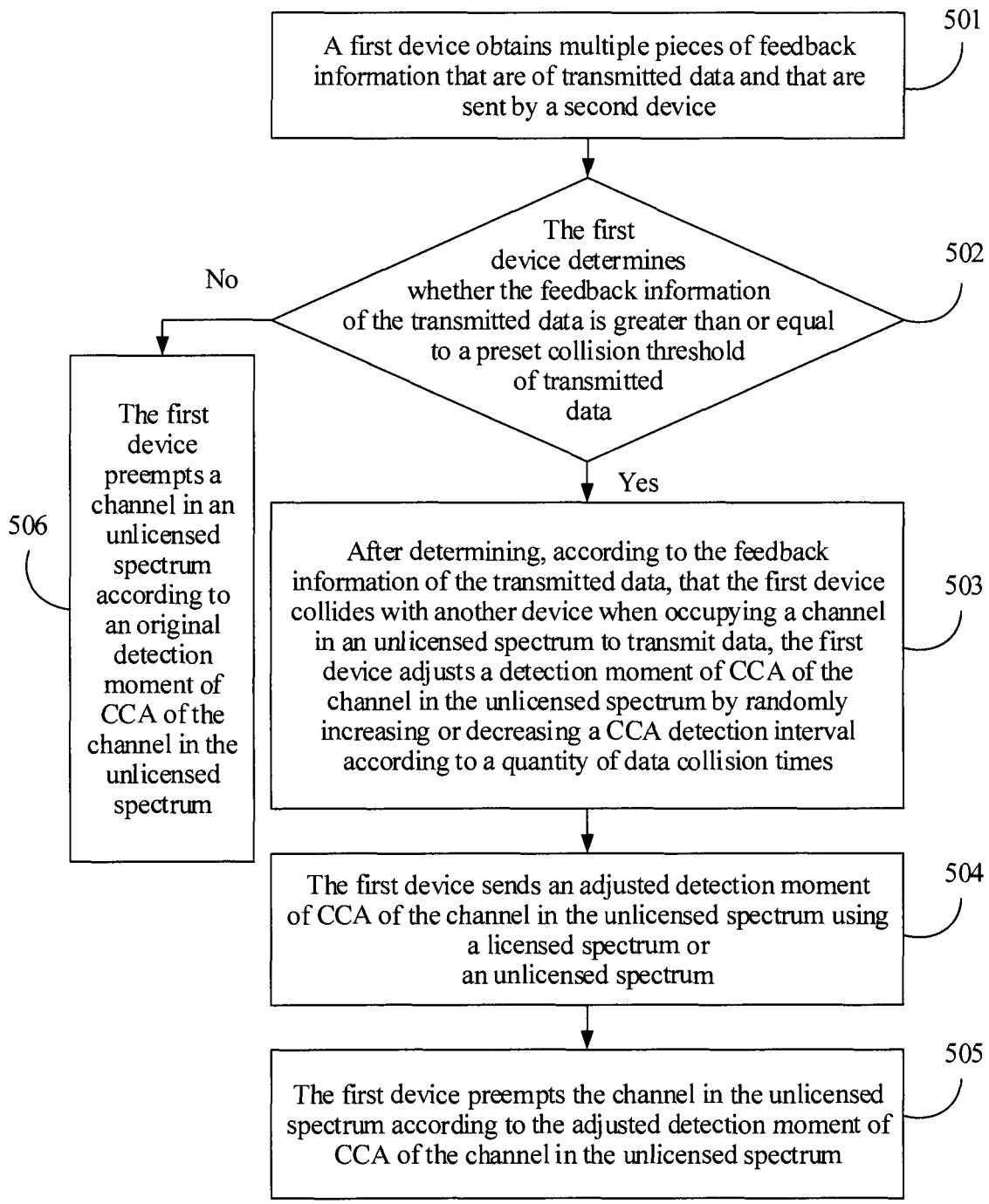
FIG. 12 is a flowchart of still yet another data transmission method according to an embodiment of the present disclosure.

An embodiment of the present disclosure provides a data transmission method. It is assumed that data collision occurs when a first device uses a first mixture operation mode of an FBE operation mode and an LBE operation mode. As shown in FIG. 12, the method includes the following steps.

Step 501: A first device obtains multiple pieces of feedback information that are of transmitted data and that are sent by a second device.

Step 502: The first device determines whether the feedback information of the transmitted data is greater than or equal to a preset collision threshold of transmitted data.

If the first device determines that the feedback information of the transmitted data is greater than or equal to the preset collision threshold of transmitted data, step 503 is performed.

If the first device determines that the feedback information of the transmitted data is less than the preset collision threshold of transmitted data, step 506 is performed.

Step 503: After determining, according to the feedback information of the transmitted data, that the first device collides with another device when occupying a channel in an unlicensed spectrum to transmit data, the first device adjusts a detection moment of CCA of the channel in the unlicensed spectrum by randomly increasing or decreasing a CCA detection interval according to a quantity of data collision times.

The first device randomly increases or decreases the CCA detection interval according to the quantity of data collision times, or the first device may randomly increase or decrease a CCA detection period according to the quantity of data collision times.

Figure 13:
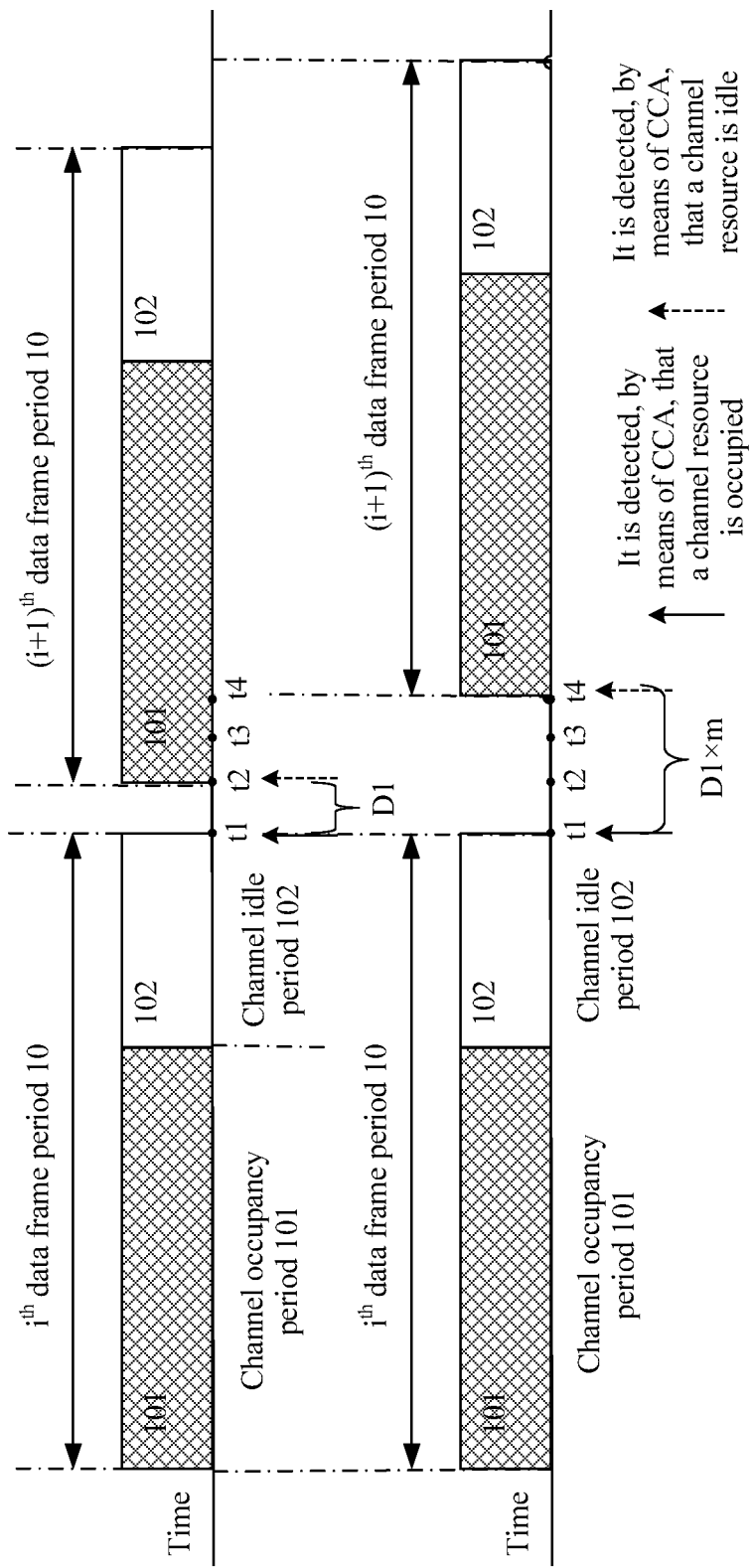
FIG. 13 is a schematic diagram in which a first device uses a first mixture operation mode of an FBE operation mode and an LBE operation mode according to an embodiment of the present disclosure.

For example, as shown in FIG. 13, an $i^{th}$ data frame period 10 includes a channel occupancy period 101 and a channel idle period 102. It is assumed that the first device occupies a channel in an unlicensed spectrum in the channel occupancy period 101 of the $i^{th}$ data frame period 10 to transmit data, and then may detect a channel in an unlicensed spectrum in an $(i+1)^{th}$ data frame period 10 at an end moment t1 of the channel idle period 102 by means of CCA, to perform a CCA backoff mechanism. It is assumed that an initial backoff value N is 1. If it is detected, by means of CCA, that the channel in the unlicensed spectrum in the $(i+1)^{th}$ data frame period 10 is occupied, the initial backoff value N remains unchanged. The first device detects the channel in the unlicensed spectrum in the $(i+1)^{th}$ data frame period 10 again at a moment t2. If it is detected, by means of CCA, that the channel in the unlicensed spectrum in the $(i+1)^{th}$ data frame period 10 is idle, the initial backoff value N is decreased by 1, an $N_c$ is 0, and the first device occupies the channel in the unlicensed spectrum in a channel occupancy period 101 of the $(i+1)^{th}$ data frame period 10 to transmit data.

However, after determining, according to obtained feedback information of transmitted data, that data collision occurs in the data that is transmitted by the first device by occupying the channel in the unlicensed spectrum in the $i^{th}$ data frame period 10, the first device may randomly increase or decrease a CCA detection period in the CCA backoff mechanism according to a quantity of data collision times. It is assumed that an initial CCA detection interval is D1. If the initial CCA detection interval is increased to m times of the initial CCA detection interval, a CCA detection interval is D1×m. Alternatively, if the initial CCA detection interval is decreased to 1/n of the initial CCA detection interval, an initial CCA detection interval is 1/n×D1. As shown in FIG. 13, a CCA interval between t1 and t2 is increased to a CCA interval between t1 and t4. After it is detected, at the moment t1, that the channel in the unlicensed spectrum in the $(i+1)^{th}$ data frame period 10 is occupied, the initial backoff value N remains unchanged. If it is detected, by means of CCA at the moment t4, that the channel in the unlicensed spectrum in the $(i+1)^{th}$ data frame period 10 is idle, the initial backoff value N is decreased by 1, an $N_c$ is 0, and the first device occupies the channel in the unlicensed spectrum in the channel occupancy period 101 of the $(i+1)^{th}$ data frame period 10 to transmit data.

Herein, m may be equal or unequal to n. A decrease time n and an increase time m are random numbers in [1, w]. A maximum value w may be progressively increased after collision occurs each time. The maximum value w may be equal to r, or may be equal to $r^2$, and r is obtained after a quantity of collision times is increased by 1. The maximum value of w may be set according to a specific condition, for example, w=10, or w=256. A specific adjustment manner of a CCA interval is not limited in the present disclosure.

Further, to ensure fairness of transmitting data by the first device, after the first device continuously occupies the channel in the unlicensed spectrum X times to transmit data, or the first device continuously fails to occupy the channel in the unlicensed spectrum Y times to transmit data, the first device may further restore an adjusted maximum value w to any maximum value w that is not adjusted. For example, when w is equal to 6, after the first device continuously occupies the channel in the unlicensed spectrum X times to transmit data, or continuously fails to occupy the channel in the unlicensed spectrum Y times to transmit data, the first device resets w to 2. Particularly, w may be further reset to an initial value 1. Both X and Y are positive integers, and may be set by a system (for example, set by the first device, set by a receiving device, or set by a third-party device) or may be randomly generated.

Step 504: The first device sends an adjusted detection moment of CCA of the channel in the unlicensed spectrum using a licensed spectrum or an unlicensed spectrum.

Step 505: The first device preempts the channel in the unlicensed spectrum according to the adjusted detection moment of CCA of the channel in the unlicensed spectrum.

Step 506: The first device preempts a channel in an unlicensed spectrum according to an original detection moment of CCA of the channel in the unlicensed spectrum.

In this way, a first device obtains feedback information of transmitted data, and after determining, according to the feedback information of the transmitted data, that data collision occurs in data that is transmitted by the first device by occupying a channel in an unlicensed spectrum, the first device adjusts a detection moment of CCA of the channel in the unlicensed spectrum by randomly increasing or decreasing a CCA detection interval according to a quantity of data collision times such that first devices stagger data transmission in a time domain as far as possible, and adjust moments of a channel in an unlicensed spectrum competed by the first devices. Therefore, a competition relationship between the first device and a first device that collides with the first device in terms of data is changed, competition times of first devices in which data collision occurs are different, and a collision reoccurrence probability can be effectively reduced after a device in an LAA-LTE system preempts an unlicensed spectrum and collides with another device.

Figure 14:
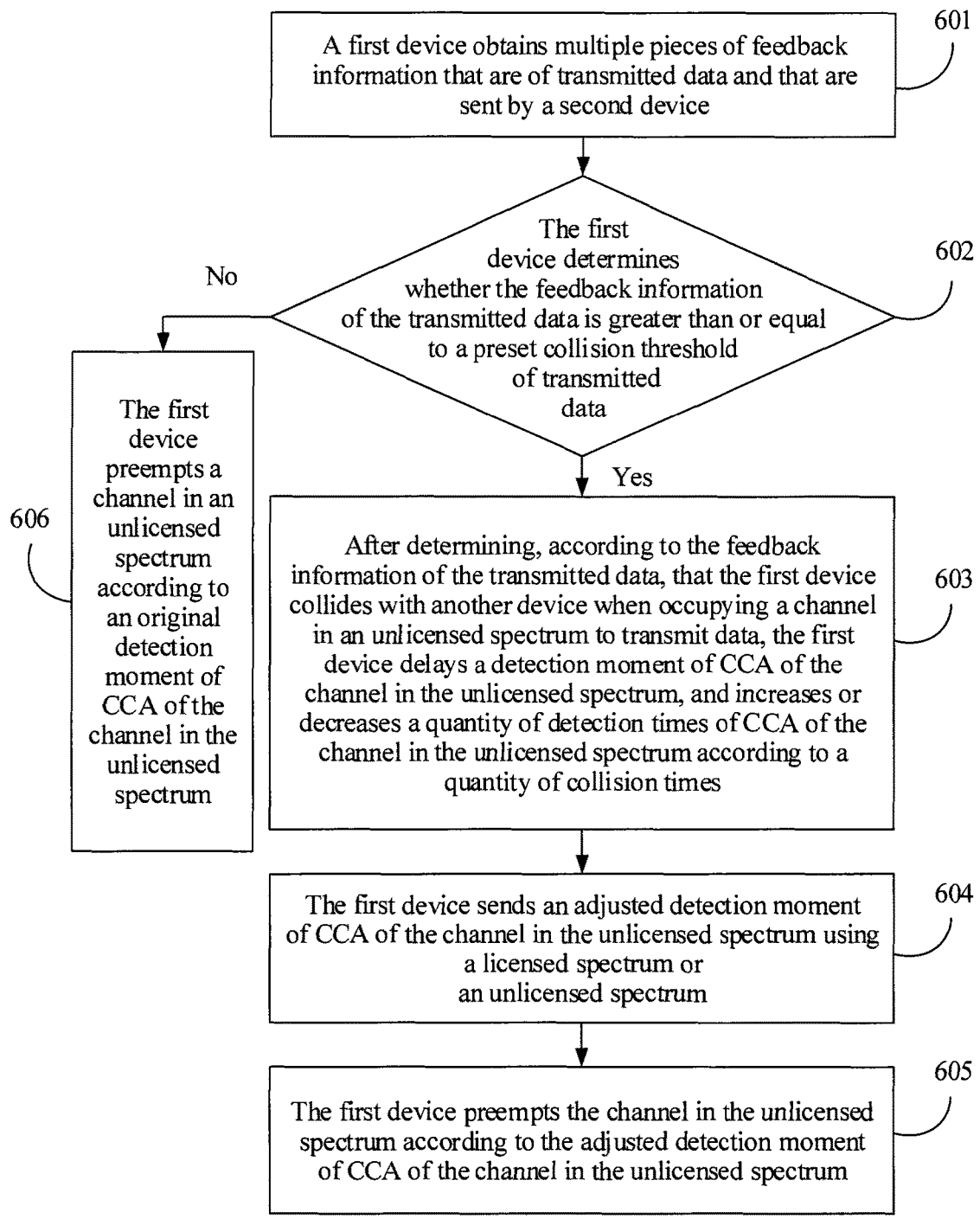
FIG. 14 is a flowchart of a further data transmission method according to an embodiment of the present disclosure.

An embodiment of the present disclosure provides a data transmission method. It is assumed that data collision occurs when a first device uses a second mixture operation mode of an FBE operation mode and an LBE operation mode. As shown in FIG. 14, the method includes the following steps.

Step 601: A first device obtains multiple pieces of feedback information that are of transmitted data and that are sent by a second device.

Step 602: The first device determines whether the feedback information of the transmitted data is greater than or equal to a preset collision threshold of transmitted data.

If the first device determines that the feedback information of the transmitted data is greater than or equal to the preset collision threshold of transmitted data, step 603 is performed.

If the first device determines that the feedback information of the transmitted data is less than the preset collision threshold of transmitted data, step 606 is performed.

Step 603: After determining, according to the feedback information of the transmitted data, that the first device collides with another device when occupying a channel in an unlicensed spectrum to transmit data, the first device delays a detection moment of CCA of the channel in the unlicensed spectrum, and increases or decreases a quantity of detection times of CCA of the channel in the unlicensed spectrum according to a quantity of collision times.

Figure 15:
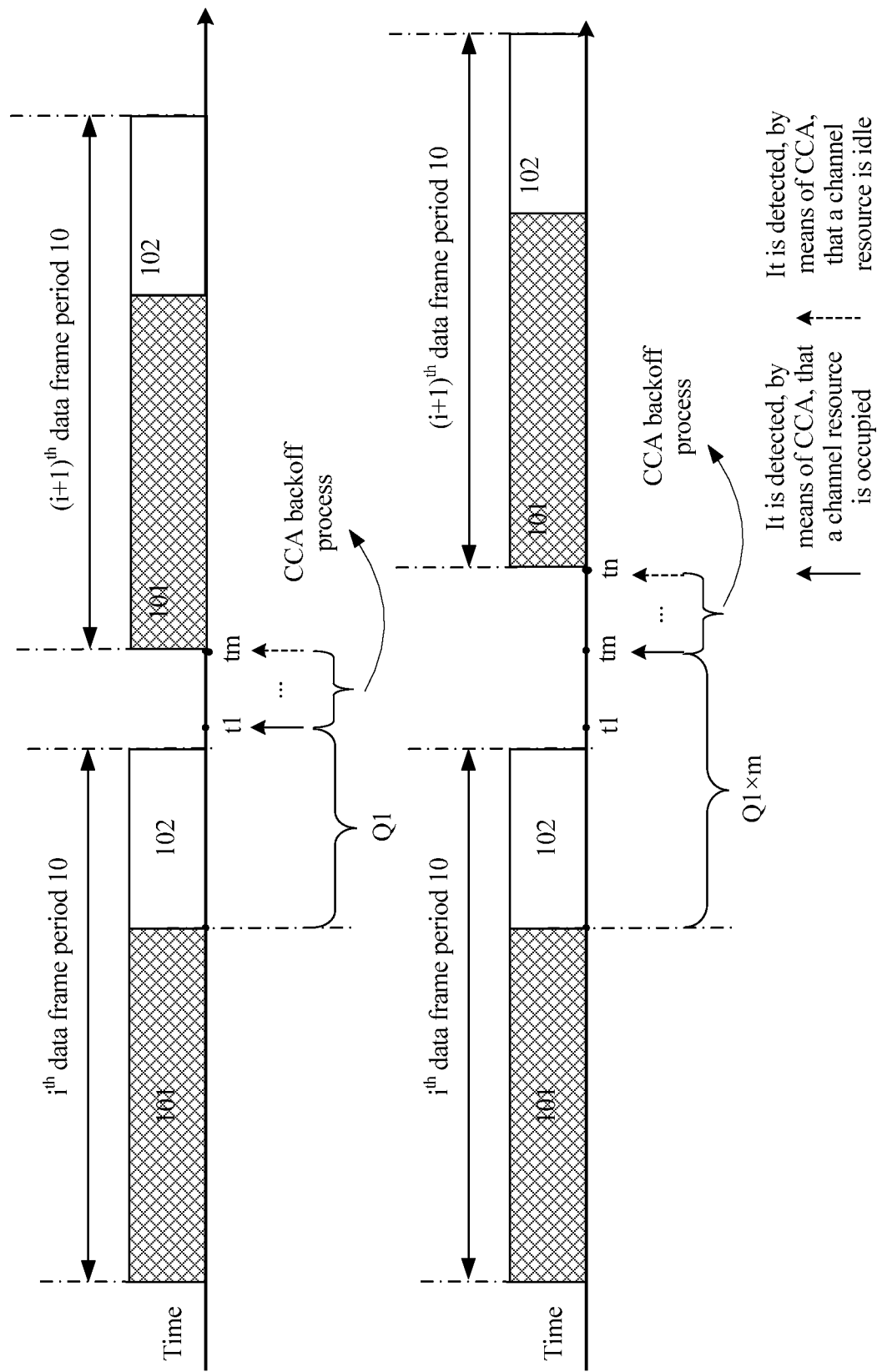
FIG. 15 is a schematic diagram in which a first device uses a second mixture operation mode of an FBE operation mode and an LBE operation mode according to an embodiment of the present disclosure.

For example, as shown in FIG. 15, an $i^{th}$ data frame period 10 includes a channel occupancy period 101 and a channel idle period 102. It is assumed that the first device occupies a channel in an unlicensed spectrum in the channel occupancy period 101 of the $i^{th}$ data frame period 10 to transmit data. After the data is transmitted, the first device waits for Q1 timeslots according to a preset idle value Q1, performs a CCA backoff mechanism at a moment t1, and detects a channel in an unlicensed spectrum in an $(i+1)^{th}$ data frame period 10 by means of CCA. If it is detected, by means of CCA, that the channel in the unlicensed spectrum in the $(i+1)^{th}$ data frame period 10 is occupied, an initial backoff value N remains unchanged. The first device continuously detects the channel in the unlicensed spectrum. If it is detected, by means of CCA at a moment tm, that the channel in the unlicensed spectrum in the $(i+1)^{th}$ data frame period 10 is idle, the initial backoff value N is decreased by 1, an $N_c$ is 0, and the first device occupies the channel in the unlicensed spectrum in a channel occupancy period 101 of the $(i+1)^{th}$ data frame period 10 to transmit data.

However, after determining, according to obtained feedback information of transmitted data, that data collision occurs in the data that is transmitted by the first device by occupying the channel in the unlicensed spectrum in the $i^{th}$ data frame period 10, the first device may randomly increase or decrease the idle value Q according to a quantity of data collision times. It is assumed that an initial idle value Q is Q1. After the initial idle value Q1 is increased to m times, a current idle value is Q1×m. Alternatively, after the initial idle value Q1 is decreased to 1/n of the initial idle value Q1, a current idle value is 1/n×Q1. As shown in FIG. 15, after the initial idle value Q1 is increased to m times of the initial idle value Q1, a current idle value is Q1×m. The first device performs the CCA backoff mechanism again. If it is determined, by means of CCA at a moment tn, that the channel in the unlicensed spectrum in the $(i+1)^{th}$ data frame period 10 is idle, the initial backoff value N is decreased by 1, an $N_c$ is 0, and the first device occupies the channel in the unlicensed spectrum in the channel occupancy period 101 of the $(i+1)^{th}$ data frame period 10 to transmit data.

Herein, m may be equal or unequal to n. A decrease time n and an increase time m are random numbers in [1, w]. A maximum value w may be progressively increased after collision occurs each time. The maximum value w may be equal to r, or may be equal to $r^2$, and r is obtained after a quantity of collision times is increased by 1. The maximum value of w may be set according to a specific condition, for example, w=10, or w=256. A specific adjustment manner for increasing or decreasing an idle value Q is not limited in the present disclosure.

Further, to ensure fairness of transmitting data by the first device, after the first device continuously occupies the channel in the unlicensed spectrum X times to transmit data, or the first device continuously fails to occupy the channel in the unlicensed spectrum Y times to transmit data, the first device may further restore an adjusted maximum value w to any maximum value w that is not adjusted. For example, when w is equal to 6, after the first device continuously occupies the channel in the unlicensed spectrum X times to transmit data, or continuously fails to occupy the channel in the unlicensed spectrum Y times to transmit data, the first device resets w to 2. Particularly, w may be further reset to an initial value 1. Both X and Y are positive integers, and may be set by a system (for example, set by the first device, set by a receiving device, or set by a third-party device) or may be randomly generated.

Step 604: The first device sends an adjusted detection moment of CCA of the channel in the unlicensed spectrum using a licensed spectrum or an unlicensed spectrum.

Step 605: The first device preempts the channel in the unlicensed spectrum according to the adjusted detection moment of CCA of the channel in the unlicensed spectrum.

Step 606: The first device preempts a channel in an unlicensed spectrum according to an original detection moment of CCA of the channel in the unlicensed spectrum.

In this way, a first device obtains feedback information of transmitted data, and after determining, according to the feedback information of the transmitted data, that data collision occurs in data that is transmitted by the first device by occupying a channel in an unlicensed spectrum, the first device delays a detection moment of CCA of the channel in the unlicensed spectrum, and increases or decreases a quantity of detection times of CCA of the channel in the unlicensed spectrum according to a quantity of collision times such that first devices stagger data transmission in a time domain as far as possible, and adjust moments of a channel in an unlicensed spectrum competed by the first devices. Therefore, a competition relationship between the first device and a first device that collides with the first device in terms of data is changed, competition times of first devices in which data collision occurs are different, and a collision reoccurrence probability can be effectively reduced after a device in an LAA-LTE system preempts an unlicensed spectrum and collides with another device.

Figure 16:
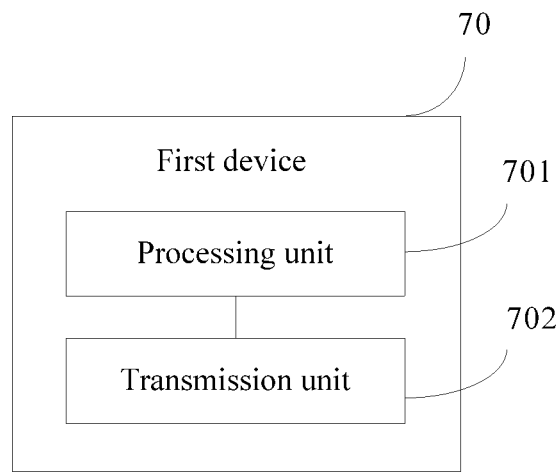
FIG. 16 is a schematic structural diagram of a first device according to an embodiment of the present disclosure.

An embodiment of the present disclosure provides a first device 70. As shown in FIG. 16, the first device 70 includes a processing unit 701 configured to adjust a detection moment or a quantity of detection times of CCA of a channel in an unlicensed spectrum after the first device determines that the first device collides with another device when occupying the channel in the unlicensed spectrum to transmit data, and a transmission unit 702 configured to occupy, according to an adjusted detection moment or an adjusted quantity of detection times of CCA of the channel in the unlicensed spectrum, the channel in the unlicensed spectrum to transmit data.

In this way, a first device 70 adjusts a detection moment or a quantity of detection times of CCA of a channel in an unlicensed spectrum after the first device 70 determines that the first device collides with another device when occupying the channel in the unlicensed spectrum to transmit data, and occupies, according to an adjusted detection moment or an adjusted quantity of detection times of CCA of the channel in the unlicensed spectrum, the channel in the unlicensed spectrum to transmit data. Therefore, a data transmission competition relationship between devices in which data collision occurs is changed, competition times of the devices in which data collision occurs are different, and a collision reoccurrence probability can be effectively reduced after a device in an LAA-LTE system preempts an unlicensed spectrum and collides with another device.

The processing unit 701 is further configured to randomly adjust the detection moment or the quantity of detection times of CCA of the channel in the unlicensed spectrum.

The processing unit 701 is further configured to adjust the detection moment of CCA of the channel in the unlicensed spectrum by increasing or decreasing a data frame length.

The processing unit 701 is further configured to delay the detection moment of CCA of the channel in the unlicensed spectrum.

The processing unit 701 is further configured to adjust the detection moment of CCA of the channel in the unlicensed spectrum by increasing or decreasing a CCA detection interval.

The processing unit 701 is further configured to increase or decrease the quantity of detection times of CCA of the channel in the unlicensed spectrum.

The processing unit 701 is further configured to delay the detection moment of CCA of the channel in the unlicensed spectrum.

The processing unit 701 is further configured to obtain feedback information of transmitted data, and determine, according to the feedback information of the transmitted data, that the first device collides with another device when occupying the channel in the unlicensed spectrum to transmit data.

The feedback information of the transmitted data is an HARQ, the HARQ includes a NACK or an ACK, the NACK is used to indicate that collision occurs in data, and the ACK is used to indicate that no collision occurs in data. Alternatively, the feedback information of the transmitted data is a request for adjusting the detection moment or the quantity of detection times of CCA of the channel in the unlicensed spectrum.

Figure 17:
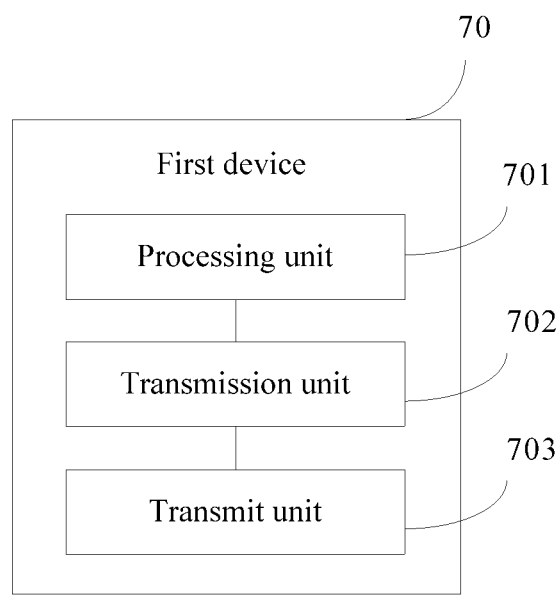
FIG. 17 is a schematic structural diagram of another first device according to an embodiment of the present disclosure.

As shown in FIG. 17, the first device 70 further includes a transmit unit 703 configured to send the adjusted detection moment or the adjusted quantity of detection times of CCA of the channel in the unlicensed spectrum.

The processing unit 701 is further configured to set the adjusted detection moment or the adjusted quantity of detection times of CCA of the channel in the unlicensed spectrum to an unadjusted detection moment or an unadjusted quantity of detection times of CCA of the channel in the unlicensed spectrum, where X and Y are positive integers if the first device continuously occupies the channel in the unlicensed spectrum X times to transmit data, or the first device continuously fails to occupy the channel in the unlicensed spectrum Y times to transmit data.

The unadjusted detection moment or the unadjusted quantity of detection times of CCA of the channel in the unlicensed spectrum is a preset detection moment or a preset quantity of detection times of CCA of the channel in the unlicensed spectrum.

Figure 18:
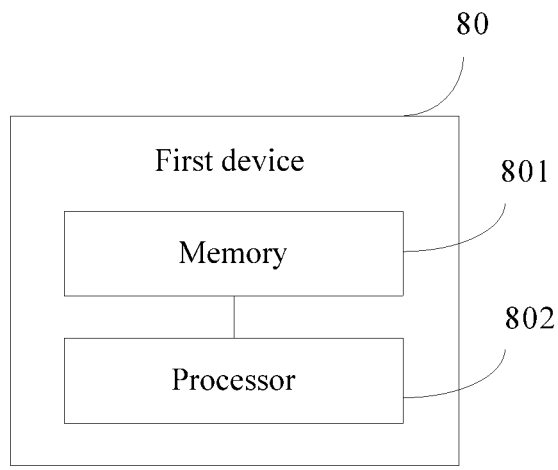
FIG. 18 is a schematic structural diagram of still another first device according to an embodiment of the present disclosure.

An embodiment of the present disclosure provides a first device 80. As shown in FIG. 18, the first device 80 includes a memory 801 configured to store program code, and a processor 802 configured to invoke the program code stored in the memory 801 to perform the following method adjusting a detection moment or a quantity of detection times of CCA of a channel in an unlicensed spectrum after the first device determines that the first device collides with another device when occupying the channel in the unlicensed spectrum to transmit data.

The method performed by the processor 802 further includes occupying, according to an adjusted detection moment or an adjusted quantity of detection times of CCA of the channel in the unlicensed spectrum, the channel in the unlicensed spectrum to transmit data.

In this way, a first device 80 adjusts a detection moment or a quantity of detection times of CCA of a channel in an unlicensed spectrum after the first device 80 determines that the first device collides with another device when occupying the channel in the unlicensed spectrum to transmit data, and occupies, according to an adjusted detection moment or an adjusted quantity of detection times of CCA of the channel in the unlicensed spectrum, the channel in the unlicensed spectrum to transmit data. Therefore, a data transmission competition relationship between devices in which data collision occurs is changed, competition times of the devices in which data collision occurs are different, and a collision reoccurrence probability can be effectively reduced after a device in an LAA-LTE system preempts an unlicensed spectrum and collides with another device.

The method performed by the processor 802 includes randomly adjusting the detection moment or the quantity of detection times of CCA of the channel in the unlicensed spectrum.

The method performed by the processor 802 includes adjusting the detection moment of CCA of the channel in the unlicensed spectrum by increasing or decreasing a data frame length.

The method performed by the processor 802 includes delaying the detection moment of CCA of the channel in the unlicensed spectrum.

The method performed by the processor 802 includes adjusting the detection moment of CCA of the channel in the unlicensed spectrum by increasing or decreasing a CCA detection interval.

The method performed by the processor 802 includes increasing or decreasing the quantity of detection times of CCA of the channel in the unlicensed spectrum.

The method performed by the processor 802 further includes delaying the detection moment of CCA of the channel in the unlicensed spectrum.

The method performed by the processor 802 includes obtaining feedback information of transmitted data, and determining, according to the feedback information of the transmitted data, that the first device collides with another device when occupying the channel in the unlicensed spectrum to transmit data.

The feedback information of the transmitted data is an HARQ, the HARQ includes a NACK or an ACK, the NACK is used to indicate that collision occurs in data, and the ACK is used to indicate that no collision occurs in data. Alternatively, the feedback information of the transmitted data is a request for adjusting the detection moment or the quantity of detection times of CCA of the channel in the unlicensed spectrum.

Figure 19:
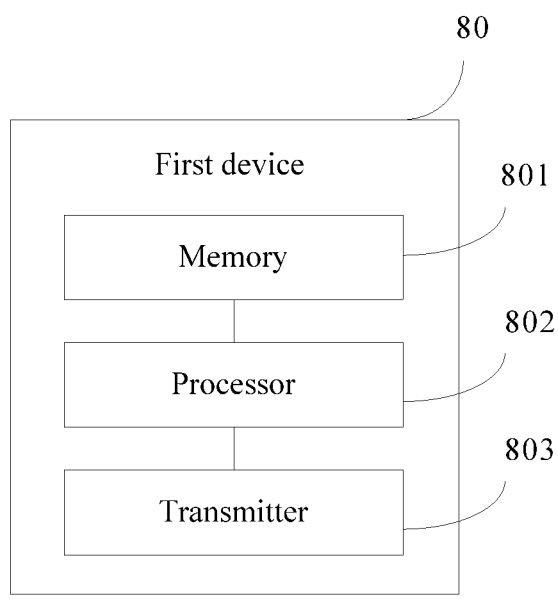
FIG. 19 is a schematic structural diagram of yet another first device according to an embodiment of the present disclosure.

As shown in FIG. 19, the first device 80 further includes a transmitter 803 configured to send the adjusted detection moment or the adjusted quantity of detection times of CCA of the channel in the unlicensed spectrum.

The method performed by the processor 802 further includes setting the adjusted detection moment or the adjusted quantity of detection times of CCA of the channel in the unlicensed spectrum to an unadjusted detection moment or an unadjusted quantity of detection times of CCA of the channel in the unlicensed spectrum if the first device continuously occupies the channel in the unlicensed spectrum X times to transmit data, or the first device continuously fails to occupy the channel in the unlicensed spectrum Y times to transmit data, where X and Y are positive integers.

The unadjusted detection moment or the unadjusted quantity of detection times of CCA of the channel in the unlicensed spectrum is a preset detection moment or a preset quantity of detection times of CCA of the channel in the unlicensed spectrum.

It should be noted that, a second device may receive the adjusted detection moment or the adjusted quantity of detection times that is of CCA of the channel in the unlicensed spectrum and that is sent by the first device such that the second device receives data transmitted by the first device at the adjusted detection moment of CCA of the channel in the unlicensed spectrum.

It may be clearly understood by a person skilled in the art that, for the purpose of convenient and brief description, for a specific working process of the foregoing apparatus and unit, refer to a corresponding process in the foregoing method embodiments. Details are not repeatedly described herein.

In the several embodiments provided in the present application, it should be understood that the disclosed apparatus and method may be implemented in another manner. For example, the described apparatus embodiment is merely an example. For example, the unit division is merely logical function division and may be other division in actual implementation. For example, multiple units or components may be combined or integrated into another system, or some features may be ignored or not performed. In addition, the displayed or discussed mutual couplings or direct couplings or communication connections may be implemented using some interfaces, and indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on multiple network units. Some or all of the units may be selected according to actual requirements to achieve the objectives of the solutions of the embodiments.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of hardware in addition to a software functional unit.

A person of ordinary skill in the art may understand that all or some of the steps of the method embodiments may be implemented by a program instructing relevant hardware. The program may be stored in a computer readable storage medium. When the program runs, the steps of the method embodiments are performed. The foregoing storage medium includes any medium that can store program code, such as a read-only memory (ROM), a random access memory (RAM), a magnetic disk, or an optical disc.

The foregoing descriptions are merely specific implementations of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A data transmission method, comprising:
  transmitting, by a first device, data using a channel in an unlicensed spectrum, obtaining, by the first device, feedback information of the transmitted data, the feedback information comprising a request for adjusting a detection moment clear channel assessment (CCA) of the channel in the unlicensed spectrum;

adjusting, by the first device, the detection moment of the CCA of the channel in the unlicensed spectrum after the first device determines, based on the feedback information, that the first device collides with another device when occupying the channel in the unlicensed spectrum to transmit the data; and occupying, by the first device according to an adjusted detection moment of the CCA of the channel in the unlicensed spectrum, the channel in the unlicensed spectrum to transmit the data.

2. The data transmission method of claim 1, wherein adjusting the detection moment of the CCA of the channel comprises adjusting, by the first device, the detection moment of the CCA of the channel in the unlicensed spectrum by changing a data frame length.

3. The data transmission method of claim 1, wherein adjusting the detection moment of the CCA of the channel comprises delaying, by the first device, the detection moment of the CCA of the channel in the unlicensed spectrum.

4. The data transmission method of claim 1, wherein adjusting the detection moment of the CCA of the channel comprises adjusting, by the first device, the detection moment of the CCA of the channel in the unlicensed spectrum by changing a CCA detection interval.

5. The data transmission method of claim 1, wherein determining that the first device collides with the other device when occupying the channel in the unlicensed spectrum to transmit the data comprises determining, by the first device, according to the feedback information of the transmitted data, that the first device collides with the other device when occupying the channel in the unlicensed spectrum to transmit the data.

6. The data transmission method of claim 5, wherein the feedback information of the transmitted data is a hybrid automatic repeat request (HARQ), the HARQ comprising one of a negative acknowledgement (NACK) and an acknowledgement (ACK), the NACK indicating that collision occurs in the data, and the ACK indicating that no collision occurs in the data.

7. The data transmission method of claim 1, further comprising sending, by the first device, the adjusted detection moment of the CCA of the channel in the unlicensed spectrum.

8. The data transmission method of claim 1, wherein after occupying the channel in the unlicensed spectrum to transmit the data, the method further comprises setting the adjusted detection moment of the CCA of the channel in the unlicensed spectrum to an unadjusted detection moment of CCA of the channel in the unlicensed spectrum when the first device continuously occupies the channel in the unlicensed spectrum X times to transmit the data, and the X being a positive integer.

9. A first device, comprising:
a memory configured to store a program code; and
a processor coupled to the memory, the program code causing the processor to be configured to:
transmit data using a channel in an unlicensed spectrum;
obtain feedback information of the transmitted data, the feedback information comprising a request for adjusting a detection moment clear channel assessment (CCA) of the channel in the unlicensed spectrum;
adjust the detection moment of the CCA of the channel in the unlicensed spectrum after the first device determines, based on the feedback information, that the first device collides with another device when occupying the channel in the unlicensed spectrum to transmit the data; and
occupy, according to an adjusted detection moment of the CCA of the channel in the unlicensed spectrum, the channel in the unlicensed spectrum to transmit the data.

10. The first device of claim 9, wherein the program code further causes the processor to be configured to adjust the detection moment of the CCA of the channel in the unlicensed spectrum by changing a data frame length.

11. The first device of claim 9, wherein the program code further causes the processor to be configured to delay the detection moment of the CCA of the channel in the unlicensed spectrum.

12. The first device of claim 9, wherein the program code further causes the processor to be configured to adjust the detection moment of CCA of the channel in the unlicensed spectrum by changing a CCA detection interval.

13. The first device of claim 10, wherein the channel in the unlicensed spectrum is occupied to transmit the data, and the program code further causes the processor to be configured to determine, according to the feedback information of the transmitted data, that the first device collides with the other device.

14. The first device of claim 13, further comprising a transmitter coupled to the processor and the memory and configured to send the adjusted detection moment of the CCA of the channel in the unlicensed spectrum.

15. A first device, comprising:
a memory configured to store a program code; and
a processor coupled to the program code, the program code causing the processor to be configured to:
transmit data using a channel in an unlicensed spectrum;
obtain feedback information of the transmitted data, the feedback information comprising a request for adjusting a quantity of detection times of clear channel assessment (CCA) of the channel in the unlicensed spectrum;
adjust the quantity of detection times of the CCA of the channel in the unlicensed spectrum after the first device determines, based on the feedback information, that the first device collides with another device when occupying the channel in the unlicensed spectrum to transmit the data;
occupy, according to an adjusted quantity of detection times of the CCA of the channel in the unlicensed spectrum, the channel in the unlicensed spectrum to transmit the data; and
change the quantity of detection times of the CCA of the channel in the unlicensed spectrum.

16. The first device of claim 15, wherein the program code further causes the processor to be configured to delay a detection moment of the CCA of the channel in the unlicensed spectrum.

17. The first device of claim 15, wherein when the first device continuously fails to occupy the channel in the unlicensed spectrum Y times to transmit the data, the program code further causes the processor to be configured to set the adjusted quantity of detection times of the CCA of the channel in the unlicensed spectrum to an unadjusted quantity of detection times of the CCA of the channel in the unlicensed spectrum, and the Y being a positive integer.

* * * * *

UNITED STATES PATENT AND TRADEMARK OFFICE
CERTIFICATE OF CORRECTION

PATENT NO.         : 10,405,346 B2                             Page 1 of 1
APPLICATION NO.    : 15/544218
DATED              : September 3, 2019
INVENTOR(S)        : Da Wang and Jian Wang It is certified that error appears in the above-identified patent and that said Letters Patent is hereby corrected as shown below:

In the Claims

Claim 13, Column 24, Line 26: "claim 10" should read "claim 9"

Signed and Sealed this
Twenty-ninth Day of October, 2019

Andrei Iancu
*Director of the United States Patent and Trademark Office*